(12) United States Patent
Duncan

(10) Patent No.: US 11,644,201 B2
(45) Date of Patent: May 9, 2023

(54) SYSTEMS AND METHODS FOR PROVIDING HIGH EFFICIENCY DEHUMIDIFICATION

(71) Applicant: Scot Matthew Duncan, Laguna Hills, CA (US)

(72) Inventor: Scot Matthew Duncan, Laguna Hills, CA (US)

( * ) Notice: Subject to any disclaimer, the term of this patent is extended or adjusted under 35 U.S.C. 154(b) by 0 days.

(21) Appl. No.: 17/333,686

(22) Filed: May 28, 2021

(65) Prior Publication Data

US 2021/0285666 A1 Sep. 16, 2021

Related U.S. Application Data

(63) Continuation of application No. 16/234,023, filed on Dec. 27, 2018, now Pat. No. 11,073,296.

(Continued)

(51) Int. Cl.
*F24F 3/153* (2006.01)
*F24F 13/15* (2006.01)
(Continued)

(52) U.S. Cl.
CPC ............... *F24F 3/153* (2013.01); *F24F 8/10* (2021.01); *F24F 13/1413* (2013.01); *F24F 13/15* (2013.01); *F24F 8/22* (2021.01)

(58) Field of Classification Search
CPC .... F24F 3/153; F24F 13/15; F24F 8/10; F24F 13/1413; F24F 8/22; F24F 3/001;
(Continued)

(56) References Cited

U.S. PATENT DOCUMENTS

| 2,928,260 A | 3/1930 | Blum |
| 2,160,389 A | 5/1939 | Palmer |

(Continued)

FOREIGN PATENT DOCUMENTS

| CN | 101849151 A | 9/2010 |
| CN | 101849151 B | 5/2013 |

(Continued)

OTHER PUBLICATIONS

"International Search Report" and "Written Opinion of the International Searching Authority," Patent Cooperation Treaty Application No. PCT/US2019/018623, dated May 10, 2019, 8 pages.

(Continued)

*Primary Examiner* — Frantz F Jules
*Assistant Examiner* — Martha Tadesse
(74) *Attorney, Agent, or Firm* — Carr & Ferrell LLP

(57) ABSTRACT

This document describes a high efficiency dehumidification system (HEDS) and method of operating the same. The HEDS systems and physical implementations can include a variety of equipment, such as fans, fluid-conveying coils, tubing and pipes, heat transfer coils, vents, louvers, dampers, valves, fluid chillers, fluid heaters, and/or the like. Any of the implementations described herein can also include controls and logic, responsive to one or more sensors or other input devices, for controlling the equipment for each implementation described herein. The HEDS system utilizes heat transfer between the fluid within the fluid-conveying coils and air passing over the coils to convert humid air into dehumidified air.

20 Claims, 13 Drawing Sheets

Related U.S. Application Data

(60) Provisional application No. 62/641,200, filed on Mar. 9, 2018, provisional application No. 62/641,211, filed on Mar. 9, 2018.

(51) Int. Cl.
*F24F 13/14* (2006.01)
*F24F 8/10* (2021.01)
*F24F 8/22* (2021.01)

(58) Field of Classification Search
CPC ...... F24F 12/003; F24F 2110/20; F24T 50/00; Y02B 30/52
See application file for complete search history.

(56) References Cited

U.S. PATENT DOCUMENTS

| | | |
|---|---|---|
| 2,200,118 A | 5/1940 | Miller |
| 2,286,604 A | 6/1942 | Crawford |
| 2,299,531 A | 10/1942 | Crawford |
| 2,515,825 A | 7/1950 | Grant |
| 3,625,022 A | 12/1971 | Johnson |
| 3,921,413 A * | 11/1975 | Kohlbeck ............... F24F 11/81 62/428 |
| 4,270,363 A | 6/1981 | Maring |
| 4,271,678 A | 6/1981 | Liebert |
| 4,380,910 A | 4/1983 | Hood |
| 4,407,134 A | 10/1983 | Snaper |
| 4,427,055 A | 1/1984 | Heavener |
| 4,559,788 A | 12/1985 | McFarlan |
| 4,642,992 A | 2/1987 | Julovich |
| 4,667,479 A | 5/1987 | Doctor |
| 4,920,756 A | 5/1990 | Howland |
| 4,942,740 A | 7/1990 | Shaw |
| 5,031,411 A | 7/1991 | Gehring |
| 5,142,396 A | 8/1992 | Divjak |
| 5,193,352 A | 3/1993 | Smith |
| 5,337,577 A | 8/1994 | Eiermann |
| 5,390,206 A | 2/1995 | Rein |
| 5,390,505 A | 2/1995 | Smith |
| 5,435,147 A | 7/1995 | Mochizuki |
| 5,540,058 A | 7/1996 | Yi |
| 5,607,011 A | 3/1997 | Abdelmalek |
| 5,613,372 A | 3/1997 | Beal |
| 5,640,153 A | 6/1997 | Hildebrand |
| 5,682,754 A | 11/1997 | Groenewold |
| 5,816,066 A | 10/1998 | Aoki |
| 5,909,378 A | 6/1999 | De Milleville |
| 5,953,926 A | 9/1999 | Dressler |
| 6,055,818 A | 5/2000 | Valle et al. |
| 6,115,713 A | 9/2000 | Pascucci |
| 6,227,961 B1 | 5/2001 | Moore |
| 6,260,366 B1 | 7/2001 | Pan |
| 6,269,650 B1 | 8/2001 | Shaw |
| 6,286,764 B1 | 9/2001 | Garvey |
| 6,645,016 B1 | 11/2003 | Andersen |
| 6,666,040 B1 | 12/2003 | Groenewold et al. |
| 6,694,757 B1 | 2/2004 | Backman |
| 6,826,921 B1 | 12/2004 | Uselton |
| 6,976,365 B2 | 12/2005 | Forkosh |
| 7,216,698 B2 | 5/2007 | Catzei |
| 7,219,505 B2 | 5/2007 | Weber |
| 7,890,215 B2 | 2/2011 | Duncan |
| 8,151,579 B2 | 4/2012 | Duncan |
| 8,406,929 B2 | 3/2013 | Duncan |
| 8,408,015 B2 | 4/2013 | Duncan |
| 8,534,346 B1 | 9/2013 | Mecozzi |
| D748,319 S | 1/2016 | Johnson et al. |
| D748,320 S | 1/2016 | Johnson et al. |
| D748,847 S | 2/2016 | Johnson et al. |
| D748,850 S | 2/2016 | Johnson et al. |
| 9,638,472 B2 | 5/2017 | Duncan |
| 9,681,515 B2 | 6/2017 | Rantala |
| D794,842 S | 8/2017 | Keen et al. |
| 10,935,262 B2 | 3/2021 | Duncan |
| 11,073,296 B2 | 7/2021 | Duncan |
| 11,333,372 B2 | 5/2022 | Duncan |
| 2002/0173929 A1 | 11/2002 | Seigel |
| 2003/0061822 A1 | 4/2003 | Rafalovich |
| 2003/0192328 A1 | 10/2003 | Kikuchi |
| 2004/0044502 A1 | 3/2004 | Ito |
| 2004/0065099 A1 | 4/2004 | Gramov |
| 2005/0038567 A1 | 2/2005 | Maeda |
| 2005/0086958 A1 | 4/2005 | Walsh |
| 2005/0097905 A1 | 5/2005 | Kwon |
| 2005/0262865 A1 | 12/2005 | Yabutani |
| 2006/0218949 A1 | 10/2006 | Ellis |
| 2007/0277955 A1 | 12/2007 | Kaiser |
| 2008/0033599 A1 | 2/2008 | Aminpour |
| 2008/0104974 A1 | 5/2008 | Dieckmann et al. |
| 2009/0050703 A1 | 2/2009 | Lifson |
| 2009/0064692 A1 * | 3/2009 | Duncan ............... F24F 3/153 62/93 |
| 2009/0171512 A1 | 7/2009 | Duncan |
| 2010/0057263 A1 | 3/2010 | Tutunoglu |
| 2011/0096503 A1 | 4/2011 | Avery et al. |
| 2011/0137468 A1 | 6/2011 | Duncan |
| 2011/0272117 A1 * | 11/2011 | Hamstra ............... G06Q 50/06 165/185 |
| 2012/0125019 A1 | 5/2012 | Sami |
| 2012/0152494 A1 | 6/2012 | Duncan |
| 2013/0125574 A1 | 5/2013 | Uselton et al. |
| 2013/0167564 A1 | 7/2013 | Burg et al. |
| 2013/0171031 A1 * | 7/2013 | Garfield ............... F24F 8/10 422/119 |
| 2013/0213608 A1 | 8/2013 | Duncan |
| 2014/0048244 A1 | 2/2014 | Wallace |
| 2014/0260367 A1 | 9/2014 | Coutu et al. |
| 2015/0204586 A1 | 7/2015 | Burg et al. |
| 2015/0204591 A1 | 7/2015 | Burg et al. |
| 2015/0233626 A1 | 8/2015 | Keen |
| 2016/0010899 A1 | 1/2016 | Johnson |
| 2016/0061473 A1 | 3/2016 | Johnson, Jr. |
| 2016/0195293 A1 | 7/2016 | Schmitt et al. |
| 2017/0142910 A1 | 5/2017 | Johnson et al. |
| 2017/0219224 A1 | 8/2017 | Duncan |
| 2017/0370366 A1 | 12/2017 | Johnson et al. |
| 2017/0370570 A1 | 12/2017 | Keen et al. |
| 2019/0277515 A1 | 9/2019 | Duncan |
| 2019/0277516 A1 | 9/2019 | Duncan |
| 2022/0186946 A1 | 6/2022 | Duncan |

FOREIGN PATENT DOCUMENTS

| | | |
|---|---|---|
| EP | 1335166 A2 | 6/2003 |
| EP | 1135166 A3 | 12/2003 |
| EP | 1426703 A | 6/2004 |
| EP | 1429083 A | 6/2004 |
| EP | 1437558 A1 | 7/2004 |
| GB | 2258743 A | 2/1993 |
| JP | S59200140 A | 11/1984 |
| JP | S6176232 U | 5/1986 |
| JP | S6189763 U | 6/1986 |
| JP | S63279035 A | 11/1988 |
| JP | H07233968 A | 9/1995 |
| JP | H09287797 A | 11/1997 |
| JP | 2002061903 A | 2/2002 |
| JP | 2004012016 A | 1/2004 |
| JP | 2005069552 A | 3/2005 |
| JP | 2005207712 A | 8/2005 |
| JP | 2005211742 A | 8/2005 |
| JP | 2006177567 | 7/2006 |
| JP | 2006207856 A | 8/2006 |
| JP | 2006292299 A | 10/2006 |
| JP | 2007064556 | 3/2007 |
| JP | 20150539427 A | 12/2010 |
| JP | 5612472 B2 | 10/2014 |
| JP | 2015028419 A | 2/2015 |
| JP | 2017072364 A | 4/2017 |
| JP | 6559640 B2 | 8/2019 |
| JP | 2019174112 A | 10/2019 |
| WO | WO2006019909 A1 | 2/2006 |
| WO | WO2008079829 | 7/2008 |

(56) References Cited

FOREIGN PATENT DOCUMENTS

| WO | WO2009033097 A9 | 3/2009 |
| WO | WO2019173046 A1 | 9/2019 |
| WO | WO2019173047 A1 | 9/2019 |

OTHER PUBLICATIONS

"International Search Report" and "Written Opinion of the International Searching Authority," Patent Cooperation Treaty Application No. PCT/US2019/018630, dated May 23, 2019, 9 pages.
"Office Action", Japan Patent Application No. 2010524203, dated Nov. 16, 2013, 10 pages.
"International Search Report" and "Written Opinion of the International Searching Authority," Patent Cooperation Treaty Application No. PCT/US2008/075491, dated Nov. 19, 2008, 5 pages.
"International Search Report" and "Written Opinion of the International Searching Authority," Patent Cooperation Treaty Application No. PCT/US2007/088007, dated Jul. 17, 2008, 13 pages.

* cited by examiner

SYSTEMS AND METHODS FOR PROVIDING HIGH EFFICIENCY DEHUMIDIFICATION

CROSS-REFERENCE TO RELATED APPLICATIONS

The present continuation application claims the priority benefit of U.S. Non-Provisional application Ser. No. 16/234,023 filed on Dec. 27, 2018, which claims the priority benefit of U.S. Provisional Application No. 62/641,211 filed on Mar. 9, 2018 and U.S. Provisional Application No. 62/641,200 filed on Mar. 9, 2018. This application is also related to U.S. application Ser. No. 16/233,800 filed on Dec. 27, 2018. The disclosures of all of the above-referenced applications are hereby incorporated by reference in their entirety for all purposes.

TECHNICAL FIELD

The present subject matter pertains to climate control systems. In particular, but not by way of limitation, the present subject matter provides for energy efficient climate control systems.

BACKGROUND

Existing coil and dehumidification unit designs commonly implemented for cooling, dehumidification and reheat duties have a number of drawbacks.

Common problems created by industry standard cooling coil, cooling unit, cooling systems and HVAC (Heating, Ventilation, and Air Conditioning) designs include, but are not limited to: high airside pressure drop; excessive cooling coil vertical height that creates a condensate "stacking" effect; inadequate numbers of coil rows can create a condensate stacking effect; inadequate and poorly designed cooling coil drain pans; excessive air velocity across the coil sections during deep dehumidification duties; excessive liquid water (condensate) being carried off of the coil into the unit and downstream ductwork; condensate carry-off being re-evaporated into the airstream; condensate being carried off and re-evaporated off of the cooling coil and drain pan systems due to compressor cycling on and off; condensate being carried off and re-evaporated off of the cooling coil and drain pan systems due to temperature swings; inability to unload far enough to provide proper temperature and RH (Relative Humidity) control when loads are light; energy waste, excessive water and chemical consumption, excessive energy rejection to, or withdrawal from, ground coupled HVAC systems; undersized ductwork and air distribution terminal units; and other common system design and operational problems, as described in more detail herein.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Various embodiments of the present subject matter provide for a High Efficiency Dehumidification System (HEDS). With the High Efficiency Dehumidification System, mold growth can be eliminated, and climate control can be provided with the use of fewer resources. That is, the system provides for reduced life cycle cost (in energy usage, water usage and maintenance), it is easy to configure and scale, and provides more reliable/resilient systems for controlling the climate within an enclosed facility. The HEDS system can be utilized in ships, residential homes, military barracks, commercial, industrial and institutional facilities, Municipal, University, State and Hospital facilities, clean rooms, laboratories, and even greenhouses for plant material such as *Cannabis* grow houses.

In some aspects, a high efficiency dehumidification system (HEDS) for providing reheated dehumidified air to a climate controlled facility is disclosed, the system comprising: an air filter bank that receives air from a first inlet source; a supply fan that causes the air to flow from the first inlet source over a cooling coil; the cooling coil containing cold fluid, the cooling coil configured to transfer heat from the air from the first inlet source into its fluid; a cooling recovery coil coupled with the cooling coil, the cooling recovery coil containing heated fluid recirculated from the cooling coil, the cooling recovery coil further configured to transfer heat from its recirculated heated fluid into the air to generate dehumidified reheated air in a cooling recovery coil plenum; and a first outlet configured to be coupled with ductwork to allow the dehumidified reheated air to pass to the climate controlled facility.

Other features, examples, and embodiments are discussed below.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1A:
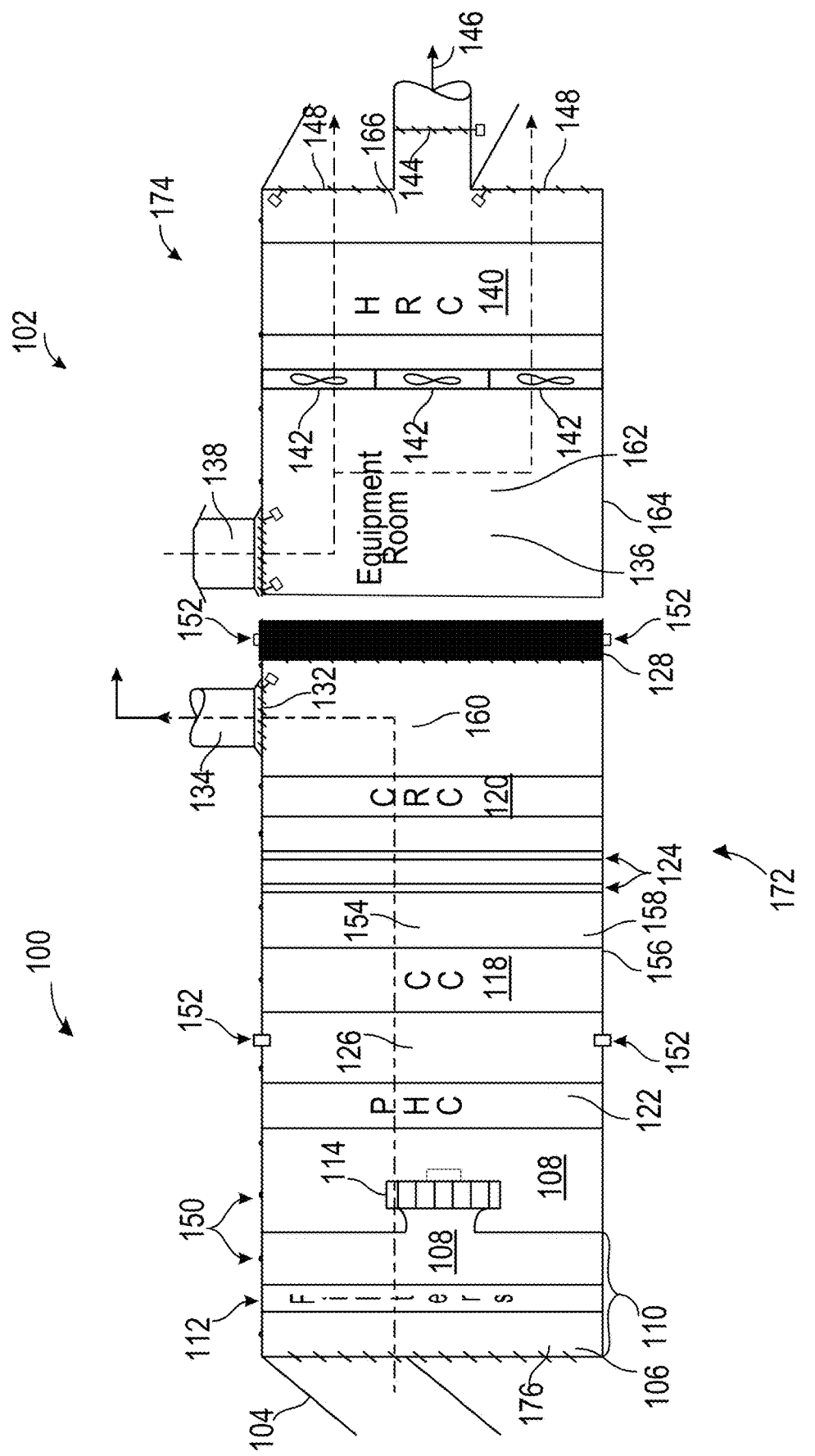
FIG. 1A is a schematic diagram of an exemplary climate control system that can be used to practice aspects of the present subject matter.

While the present technology is susceptible of embodiment in many different forms, there is shown in the drawings and will herein be described in detail several specific embodiments with the understanding that the present disclosure is to be considered as an exemplification of the principles of the present technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present subject matter. As such, some of the components may have been distorted from their actual scale for pictorial clarity.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present.

Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

The present disclosure is directed to a high efficiency dehumidification system (HEDS) and method of operating the same. The HEDS and physical implementations can include a variety of equipment, such as fans, fluid-conveying coils, tubing and piping, heat transfer coils, vents, louvers, dampers, valves, actuators, fluid chillers, fluid heaters, and/or the like. Any of the implementations described herein can also include controls and logic, responsive to one or more sensors or other input devices, for controlling the equipment for each implementation described herein. The term "water," or "fluid" as used herein, broadly describes a liquid-based heat rejection or heat transfer system. The term "air handling unit" or "fan coil unit" broadly describes equipment that is designed to provide temperature and relative humidity control to meet space conditioning and process needs. The term "plenum" broadly describes a space that can facilitate air circulation.

Energy recovery options are depicted on some implementations described herein, but are not depicted on others. One skilled in the art would understand that similar heat recovery opportunities are available from each of the implementations described herein.

While sequences of operation and software to control each implementation are generally described, one or more implementations can include software that implement algorithms and strategies that are self-tuning, self-learning, anti-equipment cycling, and are set up to make the HEDS design renewable energy and energy storage friendly, including software that allows the HEDS system to be utilized as a Distributed Energy Resource, while still maintaining the relative humidity needs of the space.

The present subject matter relates generally to air conditioning in a facility, and more particularly to cooling, dehumidification, and heating systems and processes to reduce energy waste and reduce operating costs in facilities. For example, the systems described herein can be used in any type of facility, such as in facilities that include one or more areas to be conditioned with air that has been cooled and/or dehumidified and reheated.

In some instances, the environment of a facility, such as a residential, commercial, industrial or institutional building, is tightly controlled, as temperature and humidity must fall within a relatively narrow range to accommodate human comfort, health and safety. Similarly, in some instances, temperature and humidity must fall within a relatively narrow range to accommodate the needs of laboratories, operating rooms, greenhouses, or other manufacturing and clean room facilities. Poor relative humidity (RH) control, mold, mildew, and other biological growth can cause corrosion, extensive damage to the facility, and adverse effects on its occupants, processes and products. Biological growth particularly thrives in warm, moist areas. To reduce the potential for biological growth and other damage to facilities, processes or loads, facilities need to reduce the relative humidity of air within the facility. Thus, water is removed from the air in a process called dehumidification.

In various instances, conventional methods for humidity and temperature control in a facility are energy intensive, overly complicated, and maintenance-prone, leading to high costs of operation of its cooling, dehumidification, and heating systems. Economizing either costs or energy often leads to improper use of such systems, defeating their purpose. Worse, misuse of cooling, dehumidification and heating systems permits biological growth. In humid climates, for example cooling systems may be left running twenty-four hours per day, seven days per week to reduce the potential for biological growth, even when the facility is unoccupied. This wastes substantial energy and causes undue equipment wear and premature failures, increasing maintenance and lifecycle costs.

A plenum space can be a part of a building or a piece of equipment that can facilitate air circulation for heating and air conditioning systems, by providing pathways for either heated/conditioned or return airflows, usually, but not always, at greater than atmospheric pressure. For example, space between the structural ceiling and the dropped ceiling or under a raised floor is typically considered plenum space. Similarly, an area between components of an HVAC unit can also be considered to be plenum space. For example, at the inlet to a portion of equipment there may be one or more plenums, such as a return air plenum, where air from the space is returned to the HVAC unit, an outside air, or fresh air plenum, where fresh air is brought into the unit, and/or a mixed air plenum, where the two previously described airstreams are mixed. There can also be plenums for the supply and return fans, the preheat coil, the cooling coil, the cooling recovery coil, the reheat coil, a unit discharge plenum, a cold deck plenum, a hot deck plenum, and/or a multiplicity of similar areas.4: Cooling Recovery Coil (CRC), plenum.

In some embodiments, in lieu of permanently installed components, easily removed fittings can be installed to make a retrofit simpler.

In some embodiments, the HEDS Cooling Recovery Coil (CRC) functionality reduces the cooling loads by approximately 5% to 50%+, so the chiller system size can be reduced by that amount, and the overall energy consumed by the process is reduced by similar or greater amounts.

In some embodiments, the present subject matter may be used for climate control of military barracks, or other similar spaces. For example, many barracks facilities that are not being mothballed are emptied out for weeks or months at a time when the troops are deployed. Some HVAC cooling, heating and air circulation systems must be left fully operational to prevent mold growth inside the barracks, even when the facilities are unoccupied. Thus, if the HVAC systems are shut down in these facilities, mold and other harmful biological growth, hereinafter referred to generally as mold, will start to germinate and grow rapidly if RH conditions are not maintained in the facility. Corrosion of and within the facilities is also a common concern. Within two to three weeks after shutting an HVAC system down, there will be substantial amounts of mold throughout the facility. Within months, the facilities will be unusable without completely abating, then rebuilding the buildings at a cost of tens of millions of dollars for each facility to deal with the HAZMAT, demolition and rebuilding costs when they are needed again. Consequently, without this HEDS solution, running the HVAC systems to control the humidity and mold in the spaces will require significant energy and ongoing maintenance costs.

For example, with 50 to 60 barracks buildings, maintenance will still have to be performed on over 7,000 fan coil units or VAV terminals even when the rooms are temporarily unoccupied. Any room where the Fan Coil Unit (FCU) slips a belt or the motor dies will be overtaken by mold in short order, again creating a HAZMAT condition and substantial remediation costs. Further, there may also be up to 60 sets of air cooled chillers and hot water boilers and the associated pumps that are pulling energy and wearing out. Additionally, if any of these facilities use water cooled chillers, the chemical treatment for the CT's will also need to be maintained, at least on a weekly basis, or the potential for *Legionella* growth and chiller equipment failure will increase significantly. Water use can be significant, and wasted, for these systems. In some embodiments, a HEDS unit can reclaim or eliminate the need for at least 20% to 60% of the input energy for the chiller plant, while in some instances, simultaneously eliminating the need for added reheat energy.

FIG. 1A illustrates an exemplary architecture of climate control system using HEDS technology, referred to herein as unit 100 or system 100. For example, system 100 may be a cooling, dehumidifying, and re-heating system that is configured to provide various functionalities, which are described in greater detail throughout this document.

FIG. 1A illustrates an example schematic of a configuration of the HEDS unit consistent with implementations of the current subject matter. Such configurations of the HEDS unit can be desirable to provide cool and/or dehumidified air to facilities that are occupied and/or unoccupied for a short period of time, among other uses. The HEDS unit can be an outside air unit (e.g., a unit that takes in air from outside the facility).

Figure 1B:
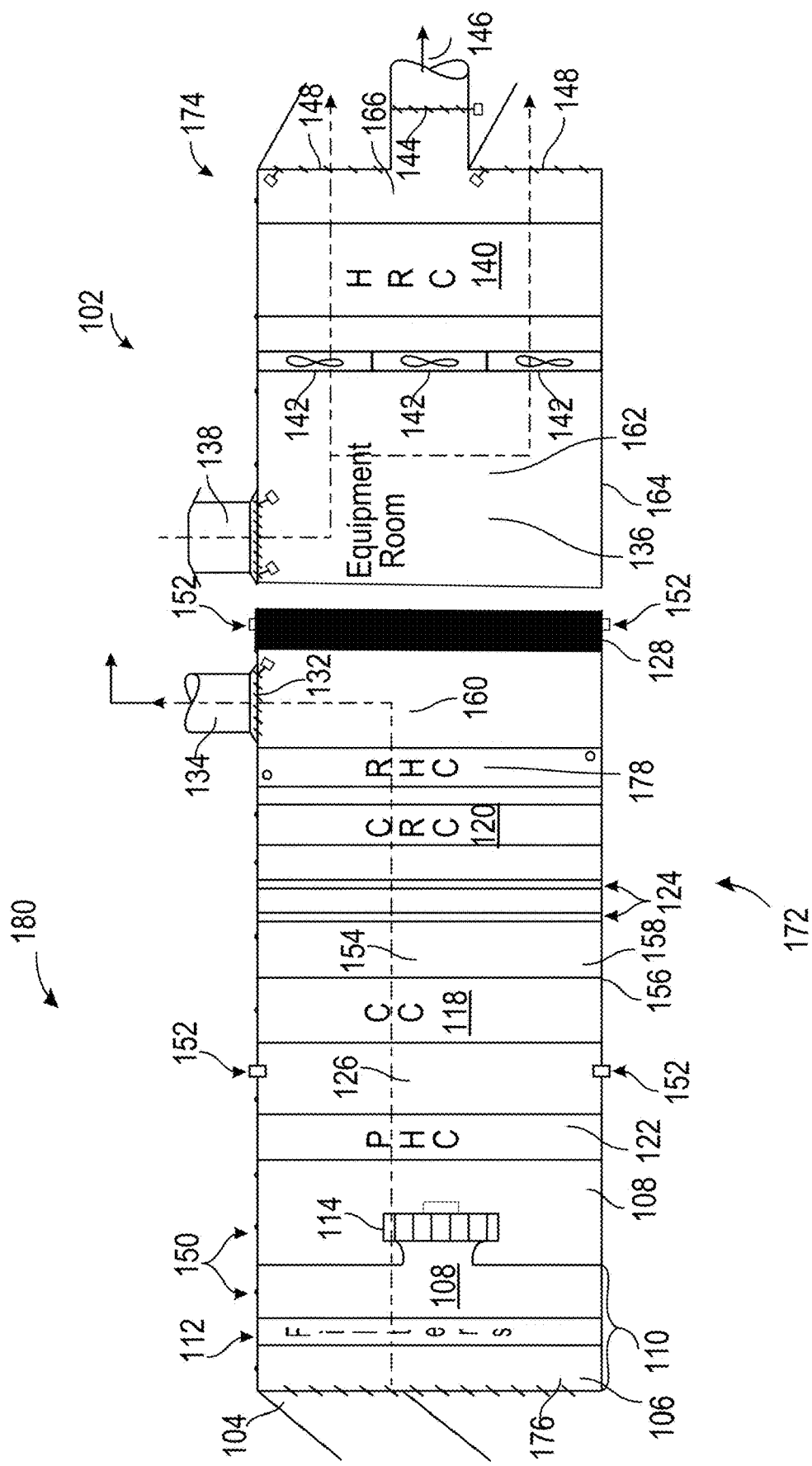
FIG. 1B is a schematic diagram of an exemplary climate control system incorporating a reheat coil that can be used to practice aspects of the present subject matter.
Figure 2A:
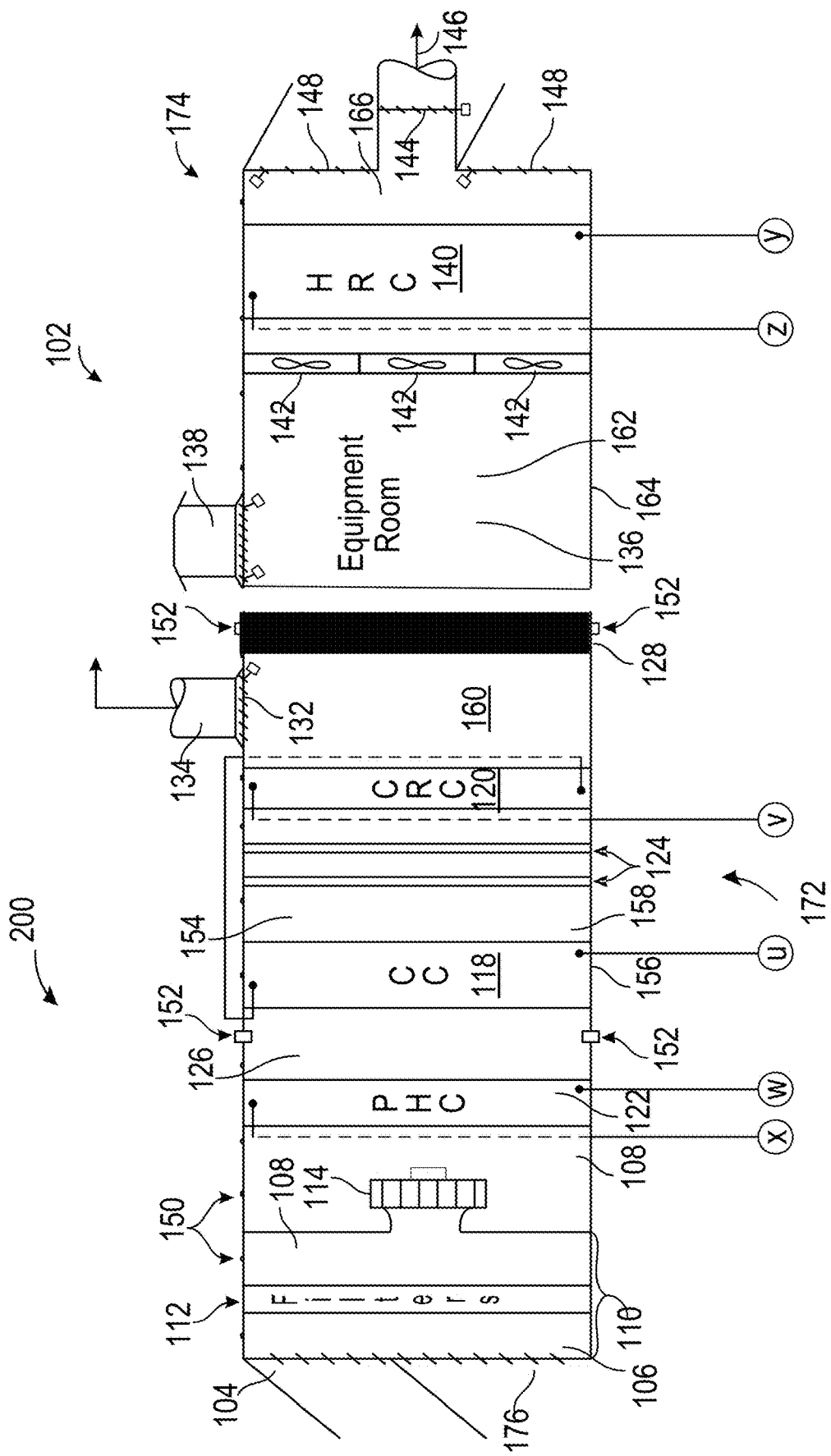
FIG. 2A is a schematic diagram of an example of a climate control system similar to the climate control system of FIG. 1A, with example piping added.
Figure 2B:
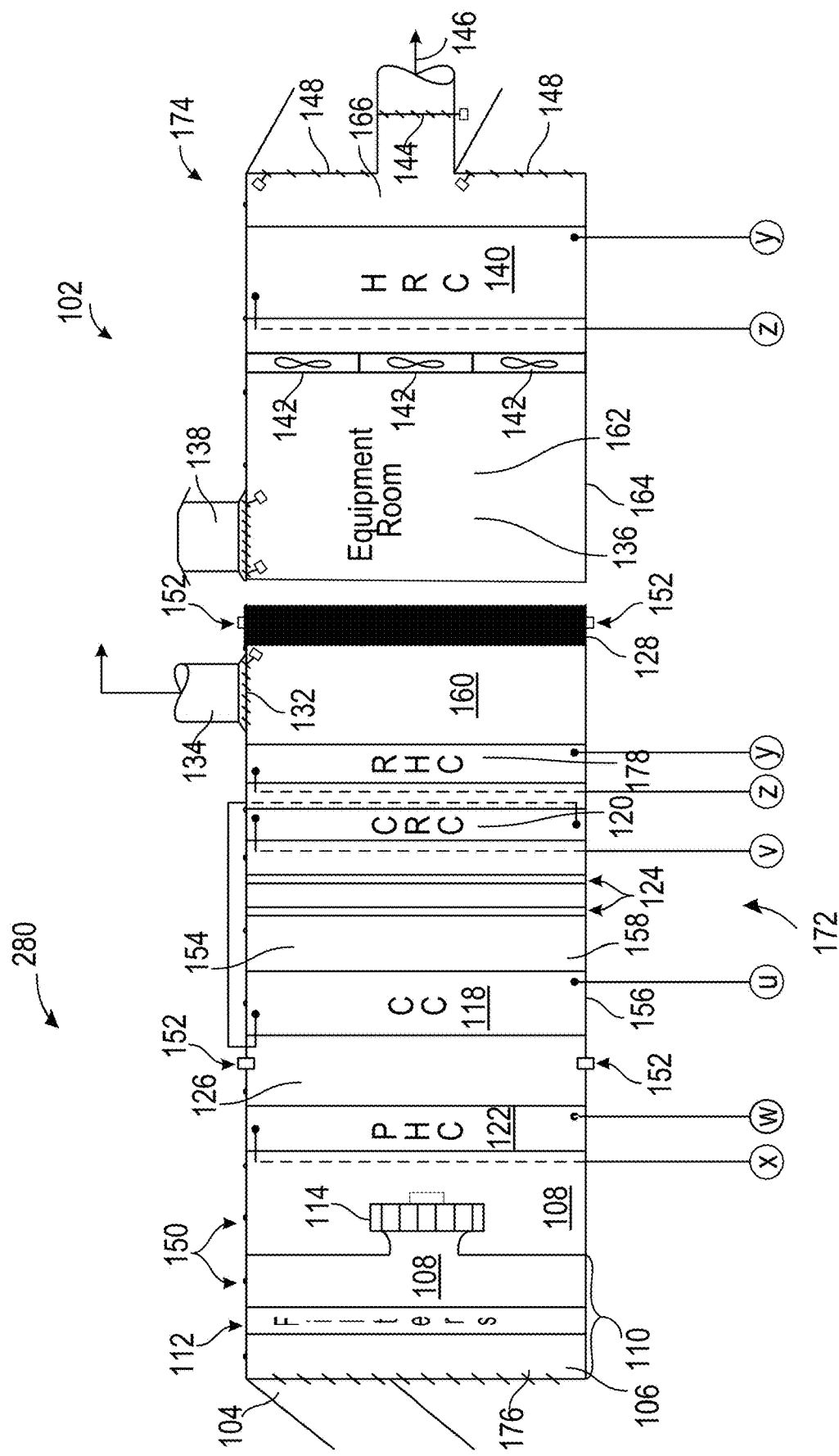
FIG. 2B is a schematic diagram of an example of a climate control system similar to the climate control system of FIG. 1B, with example piping added.
Figure 3A:
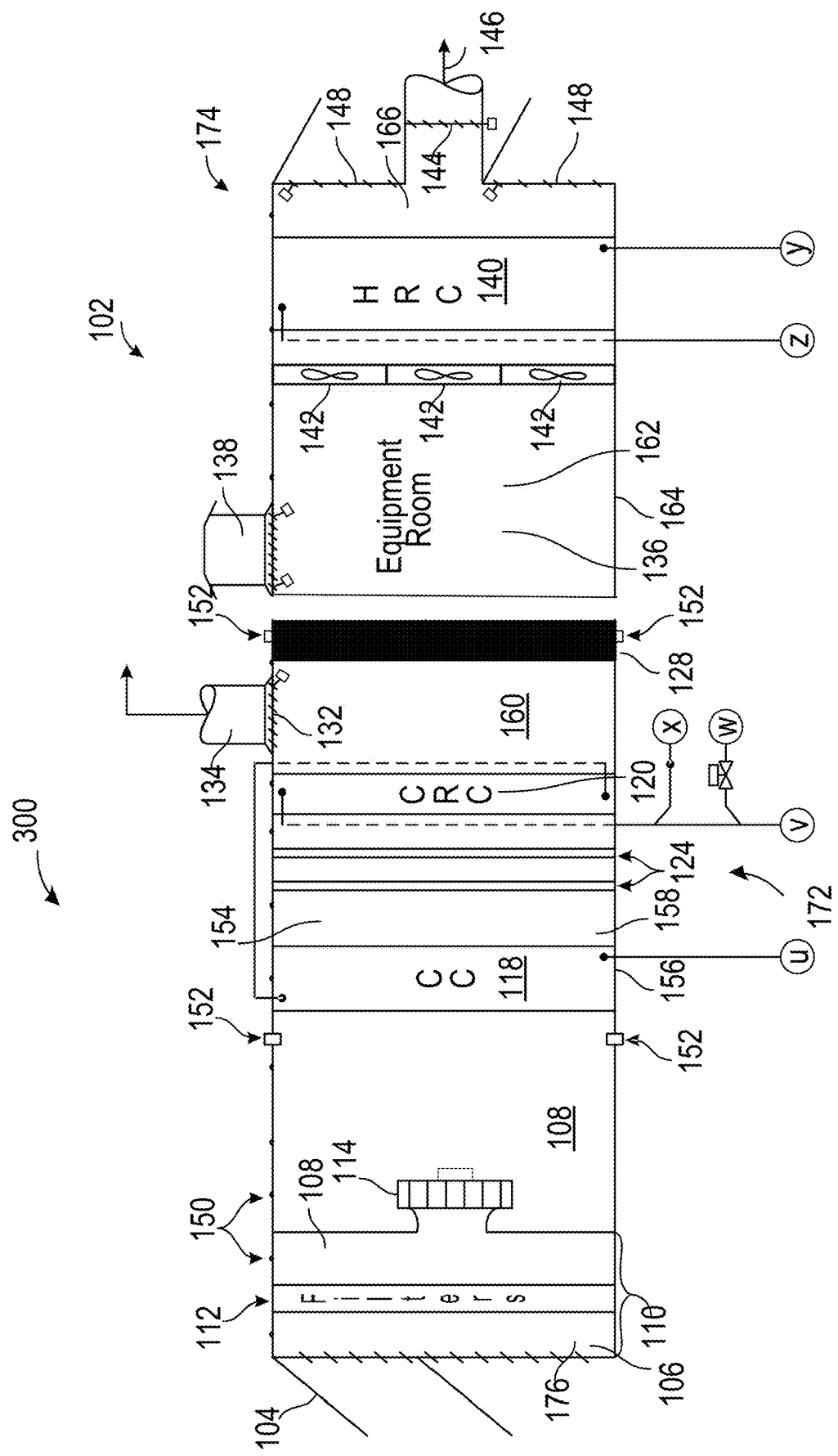
FIG. 3A is a schematic diagram of an example of a climate control system similar to the climate control system of FIG. 1A, with example piping added.
Figure 3B:
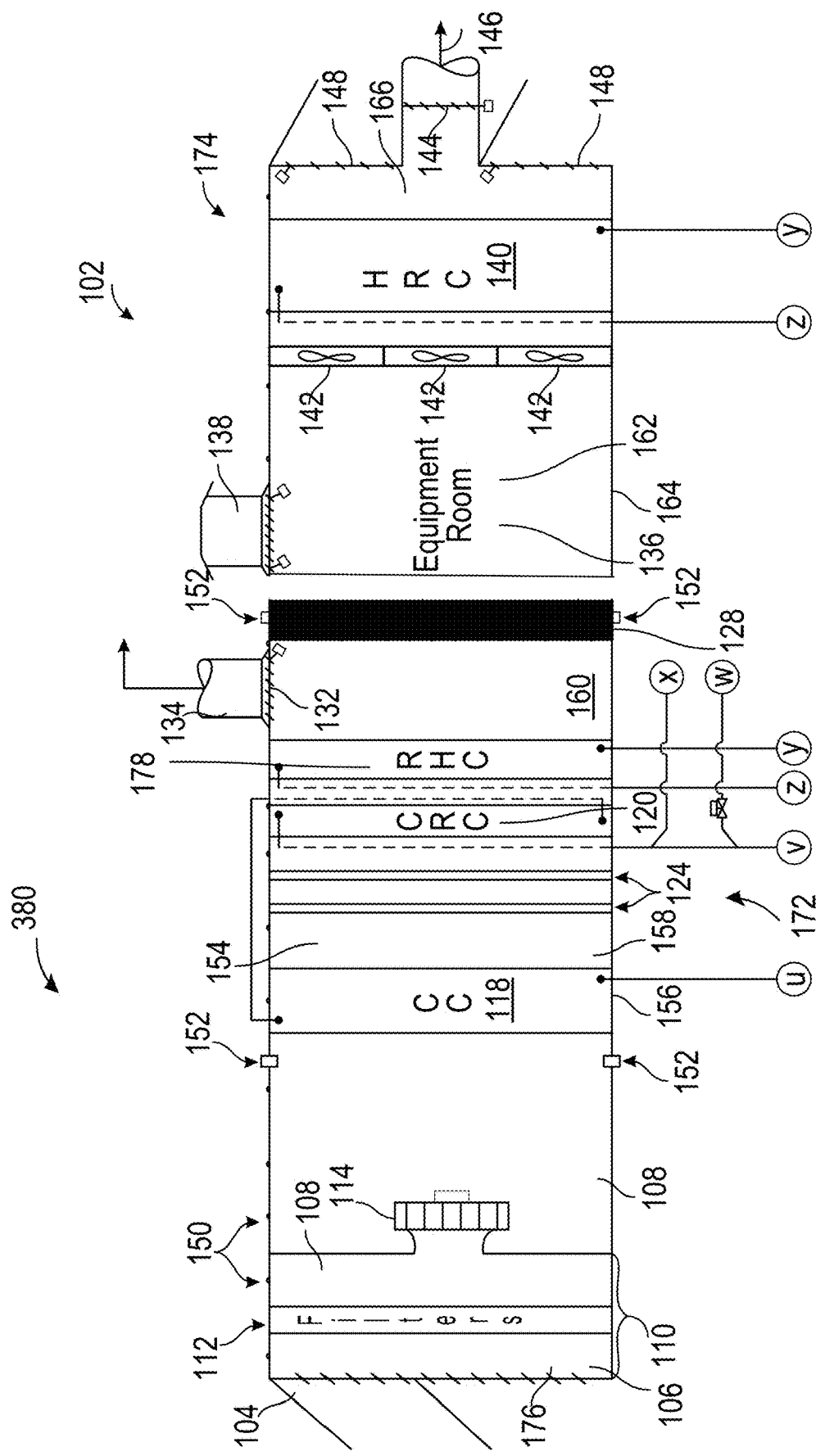
FIG. 3B is a schematic diagram of an example of a climate control system similar to the climate control system of FIG. 1B, with example piping added.

In some implementations, as shown in at least FIGS. 1B, 2B, and 3B, a reheat coil (RHC) can be installed between the CRC and the dampers/ductwork 8A/8B and the wall 9, to allow additional heat to be added to the airstream when the systems is operating in the HEDS mode, providing cooled, dehumidified and/or reheated air to the facility.

As shown in FIG. 1A, the dashed-dot line represents an airflow path in situations in which the HEDS unit is being used, such as when the facility is occupied and/or unoccupied for a short period of time. The HEDS unit can include one or more louvers 176, such as rain louvers, facing the environment to prevent rain and/or additional moisture from entering the unit. The louvers 176 can be positioned at an inlet 104 of the HEDS unit 100. The HEDS unit 100 can include an inlet plenum 106 and/or a fresh air plenum (FAP) 108 near the louvers. The FAP 108 can include an FAP drain pan 110 to collect rain and/or other moisture that passes into the HEDS unit 100, such as through the louvers 176. In some implementations, the FAP 108 can define a fresh air and/or a mixing air plenum (which is not available in 100% fresh air systems). In some implementations, the inlet 104 is positioned on a side, a top, and/or a bottom of the HEDS unit 100. The HEDS unit 100 can include one, two, three, four, or more inlets. In some implementations, the HEDS unit 100 can include a fresh air inlet (e.g., an inlet that draws in air from the outside environment) and a second inlet that draws in air from the facility through ductwork, for example, or another portion of the HEDS unit 100.

The HEDS unit 100 can include one or more air filters 112, a supply fan 114 that can draw through air and/or blow through air, and/or a supply fan discharge plenum 116. In some configurations, the one or more air filters 112 can be positioned on one side of the supply fan 114 (e.g., closer to the inlet 104) to filter the air before the air passes through the supply fan 114. In some configurations, the one or more air filters 112 are positioned on an opposite side of the supply fan 114 such that the air is filtered after passing through the supply fan 114.

In some embodiments, there is a filter bank, such as a MERV 8 filter bank followed by a MERV 14 filter bank, in series with the Cooling Coil (CC) 118, which can be in series with the Cooling Recovery Coil (CRC) 120 at the front end of the unit 100. The air filtration can take many forms; one such method is described herein.

In some implementations, the supply fan 114 can blow or draw the air past a preheat coil (PHC) 122. The PHC 122 can be positioned at least partially within or adjacent to a PHC plenum 126, but a PHC plenum 126 is not required for the system to function properly. The PHC 122 can be located in the same coil casing as the cooling coil 118, with adequate space and access to allow both sides of both coils to be cleaned using commonly available cleaning agents and tools. The PHC 122 can recover at least some heat energy (such as from a condenser) and/or reclaimed heat off of the heat rejection coil 140. In various embodiments, the PHC 122 can false load the compressor or another portion of the system 100, such as the chiller and/or cooling coil 118, up to 100%, even in some situations, in which the outside air is cool and/or has high relative humidity (e.g., 65° F. and wet air in some circumstances). Loading the chiller (directly and/or via the cooling coil 118) can generate a greater amount of heat and/or energy on the leaving air side of the unit 100, which as described below, can be rejected to further heat the air passing into the facility. In such situations, it can be desirable to dehumidify the air. Dehumidifying the air can help to reduce mold growth or other undesirable biological growth inside the facility. Dehumidifying the air within the HEDS unit 100, prior to the air exiting the unit 100, can help to reduce mold growth or other undesirable biological growth inside the AHU, ductwork and facility.

In some implementations, the air passes a cooling coil (CC) 118. In other implementations the air passes directly from the supply fan 114 to the CC 118. In some implementations, the air passes the cooling coil 118 after being pre-heated by the PHC 122. The CC 118 can condense moisture out of the air that passes the CC 118 to generate cool air that has a high relative humidity. Adding heat to the air (such as via a CRC or RHC) reduces the relative humidity of the air.

The CC 118 can be positioned at least partially within, or adjacent to, a cold plenum 154, but a cold plenum 154 is not required for the system 100 to function properly. The air that passes through to the cold plenum may be cold and with high relative humidity. As mentioned above, the PHC 122 can be located in the same coil casing as the cooling coil 118, with adequate space and access to allow both sides of both coils to be cleaned using commonly available cleaning agents and tools. The CC 118 and/or CRC 120 can include a drain pan 156 to collect moisture that condenses from the air passing through the HEDS unit 100.

In some embodiments, a condensed moisture reclamation and purification system 158 can be positioned adjacent to the CC 118.

In some implementations, the system can include Ultra Violet Germicidal Irradiation (UVGI) 124, Photocatalytic Oxidation (PCO) 172, and other chemical/biological neutralizing and/or filtration systems before the air passes to the CRC 120 and/or after passing through the CRC 120. The location shown in the exemplary figure is for convenience, but it may have alternate locations within the unit 100. The UVGI 124 may be at multiple locations within the unit 100, or downstream from the unit 100. Not all potential options have been shown. A unique benefit of HEDS that is not available with other systems is that the lower air velocities designed into HEDS units provides significantly longer contact time between UVGI 124, PCO 172, and other chemical and/or biological risk mitigation systems, and/or other heating, reheating and filtration systems, which can significantly improve their effectiveness.

The UVGI system 124 can be positioned before or after the PCO system 172. In some implementations, moisture can form on or near at least a portion of the cooling coil 118 as the air passing the cooling coil 118 is cooled. The UVGI 124 can disable potential mold or other biological growth on or near the cooling coil 118. The PCO 172 can kill the mold or other biological growth. Such configurations can be desirable since the CC 118 implemented in the HEDS unit 100 may have a large surface area and the air passing through the CC 118 may be exposed to the CC 118 for a long period of time. Such chemical/biological neutralizing and/or filtration systems can help to reduce unwanted mold or other biological growth within the system.

In some implementations, the air may hit the CC 118 at approximately 85° F. The air may hit the CC 118 at temperatures lower than 85° F., such as down to 54 to 84° F., or lower. The air may hit the CC 118 at temperatures significantly higher or lower than 85° F., such as up to or greater than 100 to 150° F., 150 to 200° F., 200 to 250° F., 250 to 300° F., 300 to 350° F., 350 to 400° F., 400 to 450° F., 450 to 500° F., 500 to 550° F., or greater. In such situations, the air can be cooled down to 53° F., for example, with a high relative humidity. The cold air can be heated to help to limit or prevent mold or other growth in the AHU (air handling unit), ductwork or the facility caused by moisture condensing onto materials within the AHU, ductwork or the facility.

Air can pass through the CRC 120 to heat the cold air, resulting in cool air with a high, but lower relative humidity. The CRC 120 can reduce the cooling load on the chiller by 5% to >65%, load dependent. For example, the fluid within the CC 118 can be warmed as the air passing the CC 118 is cooled. The warm water can flow directly or indirectly into the CRC 120 to heat the cold air. The CRC 120 can be positioned at least partially within or adjacent to a CRC plenum 160, but a CRC plenum 160 is not required for the system to function properly. In some embodiments, the CRC plenum can be an equipment room that houses all cooling equipment. Example piping configurations are illustrated in FIGS. 2A, 2B, 3A, 3B, 4A, 4B, 5A, and 5B.

The CRC plenum 160 may further contain control dampers 134 for HEDS loads. The control dampers can adjust the air flow from the CRC plenum 160 to the air handling unit via ductwork 132. The CRC plenum may further be contained by a wall 128 of the space.

In various embodiments, after the air passes through the CRC 120 to reduce the chiller load and raise the CRC leaving air temperature to lower the RH of that air, the air passes through an outlet. The outlet can include ductwork 132 that is coupled with a portion of the facility, such as a targeted room or area in the facility. In some implementations, the outlet can include a damper 134 that can open and/or close the outlet or modulate as required to control airflow or air pressure.

In some implementations, the HEDS system 100 can be coupled with a cooling plant 102 and/or a portion of a cooling plant 102. The cooling plant 102 and/or any of the components of the cooling plant 102 can be positioned adjacent the system 100. In some implementations, the cooling plant 102 can be positioned separated from the system 100 and can be positioned inside and/or outside of the facility. The cooling plant can be coupled with the HEDS system 100 by at least one or more piping configurations, such as the piping configurations shown in FIGS. 2-5B.

The cooling plant 102 can include an equipment room. The equipment room may or may not be positioned adjacent the system 100. Air enters cooling plant 102 via an inlet 138. The air entering inlet 138 may be the same as air exiting through the damper 134. The inlet 138 further has dampers to control the flow of air into the equipment room as needed.

The equipment room may have a control panel 136 and/or other electronic components/panels, electrical gear, the pump Variable Frequency Drives (VFD's), the pumps, the chiller, the condenser and/or the air cooled heat rejection coil 140 for the chiller condenser side as described above, among other components or equipment. Such components may be positioned within and/or outside of the equipment room in various portions of the facility, for example. The equipment room can include an air inlet 138 and dampers positioned at the top and/or side of the equipment room. The dampers can allow air into and out of the equipment room.

The equipment room may further comprise one or more batteries 162. While a battery 162 is depicted in exemplary FIG. 1A in a specific location, one or more batteries may be positioned in different locations of system 100. The equipment room may further comprise a drain pan 164 to collect any condensed fluid from the air.

In some implementations, the equipment room can include and/or be coupled with a supply fan and/or a heat rejection coil (HRC) 140, among other components. As air passes through the equipment room and/or passes by any of the components within the equipment room or other portion of the facility, the air can be heated. The heated air can pass through the HRC 140, which rejects heat, causing the temperature of the air to increase. For example, the HRC 140 can reclaim the heat generated by the cooling plant 102 or portion of the cooling plant 102, and reject that heat to cause the temperature of the air passing through the HRC 140 to increase significantly, depending on the loads being served by the cooling plant 102. The heated air can then pass through the open dampers 148 to the outside environment, and out of the unit.

Within the equipment room, or adjacent to the equipment room, a fan array 142 may be present for air cooled condenser or fluid cooler (heat rejection).

An auxiliary heat rejection coil (HRC) 140 for a chiller and/or an air cooled condenser coil (water, fluid, or refrigerant based) may also be present in some embodiments of system 100. As used herein, a chiller is a system that removes heat from a liquid via a heat exchanger.

After air passes through a heat rejection coil 140, it may exit through a discharge air plenum space 166. While not depicted, in some embodiments, the hot/dry air plenum can include one or more preheat, reheat, and/or energy recovery coils. From the discharge air plenum space 166, the air passes through ductwork 146 into the space where the climate is being controlled via control dampers 144. Additionally, or alternatively, air can pass through to an outside environment via control dampers and rain shield 148.

In some embodiments, HEDS unit 100 may optionally include mounting tabs 150 for photovoltaic systems and/or solar thermal panels. In various embodiments, other types of power may be provided in addition to, or instead of, solar power. HEDS unit 100 may include separation flanges 152 to allow normal freight and simplified installation into tight spaces. In some embodiments, the normal freight may be the size of a shipping container. HEDS unit 100 may also include alternating current motors 174, with direct current motors/equipment as an option, and/or variable speed motors.

In various embodiments, installation of the system 100 within a facility is relatively simple as there are only three or four connections to this unit—a single point power connection, the ductwork, the chilled water piping, and if needed the hot water piping. The system 100 may be installed anew, or can be retrofitted into an existing HVAC system of a facility.

In various embodiments, the warm to hot air temperature leaving the HEDS unit 100 acts to lower the RH of the air entering the occupied spaces which helps to offset any moisture that makes its way into the facility. Many facilities are "leaky" with respect to air—a lot of outside air makes it into each occupied space, even when the windows and doors are closed, so it is necessary to provide very low RH air to the spaces to overcome this problem.

In various embodiments, sensing equipment is utilized in order to maintain the facility at a slight positive pressure relative to ambient pressure.

In some embodiments, the supply air leaving the HEDS unit 100 provides approximately 30% to 50% RH conditions in the facility for much of the dehumidification season. These conditions are too dry for many kinds of mold to germinate and grow.

In various embodiments, the HEDS unit 100 operates for 12 hours or less per day, cutting energy use by another 40% or more. In some instances, depending on how tight or loose the facility is to ambient conditions, the overnight and weekend HEDS run-time may be dropped down to 4 to 6 hours per day, or the run-time may be as high as 14 hours per day. For facilities that have a very high air leakage rate or the loads are critical, the HEDS run time may need to be continuous. The runtime and supply air volume, dew point and temperature conditions are optimized continually, based on measured internal conditions, to minimize overall energy consumption, while ensuring dry indoor space conditions and reducing mold growth, corrosion and other RH-related issues to the greatest extent possible.

In various embodiments, the HEDS unit is an ASHRAE 90.1 Prescriptive Energy Code compliant DOAS unit or AHU/FCU that provides clean, low dew point fresh air to the facility. HEDS is one of the few HVAC system designs that is ASHRAE 90.1 Prescriptive Energy Code compliant regarding relative humidity control. The vast majority of HVAC systems in existing facilities do not comply with recent versions of ASHRAE 90.1 Prescriptive Energy Code. In general, the ASHRAE 90.1 Prescriptive Energy Code does not allow any form of heating or reheating of air for relative humidity control, if the heat or reheat is not from a reclaimed or solar-thermal source. HEDS is the only cost effective ASHRAE 90.1 Prescriptive Energy Code RH control system that can be applied for systems ranging from less than 100 CFM (i.e. barracks), to greater than 1,000,000+ CFM (i.e. aircraft paint hangars, known as corrosion control facilities) and all sizes in between. HEDS is the only ASHRAE 90.1 Prescriptive Energy Code compliant solution that physically fits in many of the existing Air Handling Unit (AHU), Dedicated Outdoor Air System (DOAS), Packaged Terminal Air Conditioner (PTAC) and Fan Coil Unit (FCU) locations.

Other potential ASHRAE 90.1 Prescriptive Energy Code solutions exist, however, they can hurt chilled water system Temperature Differential (TD), which actually increases chiller plant energy use. Further, other systems provide little to no supply air temperature control; are too big to physically fit in the available space; require lots more ductwork; have increased maintenance costs and issues; have a higher air pressure drop, (up to 2" added on supply side and up to 2" added on exhaust side); require more fan energy due to higher air pressure drops; have condensate re-evaporation when blown off of the cooling coil, with the potential for mold growth; require a new, added source of heat to regenerate the desiccant wheel. In addition, many desiccant based systems require post-unit cooling to drop the supply air temperature down (the supply air temperature can be 110° F. on the discharge side of the wheel).

With HEDS units, mold problems can be reduced across the board, not solely in large AHU systems. The HEDS Units can be used to control the climate in barracks or other types of facilities for human occupation, greenhouses for plant occupation, or other types of spaces where environmental conditions need to be tightly controlled (such as clean rooms).

In various embodiments, the HEDS incorporates simple, but advanced technology that does useful work by reclaiming some of the input energy. There can desirably be less energy waste. The reclamation of cooling energy as a reheat energy source is advanced, simple and novel. Further, the ability to reclaim energy input into the cooling/dehumidification/reheat process has never been done to save mothballed barracks from becoming mold infested.

In some embodiments, the systems according to implementations of the current subject matter capture some of the energy used to drive water around, as well as some of the heat that escapes into the AHU (as described herein, the supply air plenum). For example, even some of the energy consumed by the control panels and variable speed drives can be reclaimed to lower the RH of the supply air.

In various embodiments, the present technology allows for "exceptional energy savings". No other technology can reduce both the cooling and heating loads related to temperature and relative humidity control at the same time, eliminating approximately 20% to >40% of the cooling plant loads and up to 100% of the reheat energy loads. Cooling plant 102 load reductions are between 20% at the low end and at least >65% at the high end, averaging around 30%, while completely eliminating the need to run the boilers for RH control. In various embodiments, the base case chiller can use additional condenser fan energy to reject all of the heat to the atmosphere, and the base case boiler can lose substantial heat due to cycling on and off at very low loads.

In some embodiments, the base case barracks fan coil units use very inefficient fractional HP motors and fan wheels and must be run continuously to ensure that RH conditions are maintained, even when the barracks are unoccupied. Since the HEDS delivers low dew point air at very low RH levels, it is possible to only run it for a fewer number of hours compared to existing systems (e.g., 12 hours per day or less), vs. 24 hours per day for the base case, while still keeping the facilities dried out. For example, if the barracks that are being mothballed are of a newer design and are equipped with a DOAS system, there are still operational and energy issues to be overcome as described above. If the DOAS has no reheat function, it will pump cold, high RH air into a wet space, and it has the potential to create bad mold situations during certain times of the year.

In various embodiments, the systems implemented according to the current subject matter integrates several mechanical and control optimization strategies, all into one self-contained package. In some embodiments, the HEDS controls feedback to the chiller to reset the chilled water supply temperature and the chilled water system flow rate to minimize chiller plant energy waste while meeting facility internal temperature and RH criteria. Monitoring of internal space conditions can be utilized to reduce equipment run time, while simultaneously maintaining the spaces at low RH conditions to reduce the potential for biological growth.

Control System

In exemplary embodiments of the present disclosure, a control system may be utilized to control the methods of dehumidifying a space. Control system instrumentation inputs may include one or more of the following:

(1) Differential pressure for air filter(s)

(2) Air Conditions at various points in the process, such as: Fresh air intake conditions, Return air conditions, Mixed air conditions, Supply fan plenum conditions, Preheat coil leaving air conditions, Cooling coil leaving air conditions, Cooling Recovery Coil leaving air conditions, Reheat coil leaving air conditions, Supply air conditions, and Exhaust air conditions.

(3) Space or process load conditions (4) Conditions for other energy recovery or reclaim, or heat transfer systems, including: Dry bulb temperature, Wet bulb temperature, Dewpoint temperature, Relative Humidity.

(5) Setpoints, including minimum and maximum setpoints, for each of the above variables, Air flow rate, Air flow rate setpoints, including minimum and maximum setpoints.

(6) Water flow rates and inlet and outlet temperatures for each coil system, Water flow rates and inlet and outlet temperatures for each energy recovery or heat transfer system, and/or Water flow rates and inlet and outlet temperatures for each cooling and heating system, among other conditions.

(7) Energy associated with all coils, energy recovery, heat transfer system, cooling and heating system and their parasitic loads (pumps, fans, etc.)

(8) Air distribution/return/exhaust systems and space/process conditions as appropriate fan kW (kilowatt), all fan types, i.e. supply, return, exhaust, lab hood, make up air unit, recirculating air unit, Fan speed, all fan types, i.e. supply, return, exhaust, lab hood, make up air unit, recirculating air unit, Pressures, pressure differentials, relative pressures, filter pressure drop, both setpoints for these variables and the actual value of the variables.

(9) Damper position commands, return air, fresh air, economizer VAV (Variable Air Volume), CAV (Constant Air Volume), MZU (Multi-Zone Unit), FPMXB, other air distribution equipment

(10) Damper position, actual, return air, fresh air, economizer VAV, CAV, MZU, FPMXB, other air distribution equipment

(11) Information available from a cooling plant—for example, chillers, heat recovery chillers, heat pumps, glycol chillers, ground source heat pumps, primary, secondary and tertiary chilled water pumps, cooling tower fans, condenser water pumps, chilled water supply temperature set point and actual values, evaporator refrigerant temperature, pressure, and approach temperature, condenser water supply temperature set point and actual values, condenser refrigerant temperature, pressure, and approach temperature, refrigerant superheat, chiller KW and motor speed and frequency, chilled water and condenser water flow rates, temperature differentials, pressure differentials. Evaporator and condenser differential pressure minimum and maximum setpoints, compressor Inlet Guide Vane (IGV) position commands and actual positions, on/command status, on/off status, load recycle status, alarm status, refrigerant level, evaporator, refrigerant level, condenser, other information that is available via a network connection (such as hardwired, RF (radio frequency), Bluetooth, Wi-Fi, or other wired or wireless network connection).

Instrumentation can be included to measure the air pressure drop across the cooling recovery coil(s) (CRC). This air pressure drop can be used to calculate the air flow rate of the fresh air entering the system. The CRC is a dry coil, with no condensation occurring, so the air pressure drop will not vary as the loads vary, only as the CFM's (cubic feet per minute) vary, so this is a viable and repeatable control methodology.

The air pressure drop across the CRC(s) can be high enough that reasonably priced instrumentation can be utilized to measure the differential pressure and air flow. With a typical reheat coil, the air pressure drop at 100% air flow may only be 0.01" to 0.03". Pressure drop varies with the square of air flow, so as the air flow drops off, the air pressure drop across the coil drops off very rapidly. HEDS CRC's are larger and have a higher air pressure drop, so the measurements will be more accurate and repeatable.

A HEDS-unique control algorithm can be used to modulate the damper systems, fan speed and other variables as needed to maintain the desired fresh air temperature that is delivered to the facility. The fresh air temperature is varied based on time of day, type of day, day of week, occupancy, operational mode, demand controlled ventilation controls and other variables. In some embodiments, wired or wireless sensors may be placed within a facility to transmit information about temperature and/or relative humidity back to a controller that can modulate variables within the facility.

Benefits Provided by the Present Invention

In various embodiments, the following numerated list of results below may be accomplished by the embodiments of the HEDS unit described herein. The following list is not exhaustive, as the system described herein can accomplish other and/or additional results.

1. Saves lives. Can help to solve healthcare and medical center issues, reduces Healthcare Acquired Infections (HAI), reduces healthcare costs.

2. Eliminates mold growth associated with the HVAC system. The initial reason for the present implementation of the current subject matter is to eliminate mold growth in barracks and other military facilities.

3. Better living and working environment for our military. Our warfighters and support staff should not be living and working in mold.

4. Better living and working environment for occupants of Commercial, Industrial, Institutional (CII) and Municipal buildings, Universities, other Schools, and nonprofit Hospitals (MUSH) markets.

5. Saves large amounts of energy related to RH control (40%+in many applications). Energy independence, lowers pollution and GHG's.

6. Improves time on station for naval vessels. Less energy required equals less refueling required.

7. Reduces fossil fuel use. Extends Americas reserves of energy, renewables friendly, lowers pollution. Reduces GHG/climate change issues.

8. Can help shape electrical grid loads and is renewable friendly. Reg-up, reg-down, demand response, broad increases and decreases in the grid demand profile.

9. Reduces power plant and facility water use/waste. Less chiller energy use equates to less water and chemical consumption for water cooled chillers. Less site energy use equates to less power plant water use for water cooled power plants, and less chemicals as well for cooling tower cooled plants. Water use/waste is an upcoming issue.

10. Increases the size of Energy Service Performance Contract (ESPC)/Utility Energy Service Contract (UESC) public/private partnerships to save the Federal Clients (and taxpayers) even more money. HEDS has a rapid financial payback that can be leveraged to include more projects for Federal Clients. Helps to reduce capital spending by the Federal Clients.

11. Improves manufactured product quality and increases American competitiveness, reduces product and energy waste.

12. Improves worker productivity by increasing American competitiveness and providing workers more time at home with their families.

13. A 1% improvement in worker productivity offsets the entire annual utility bill for many facilities. For example, 1% improvement equates to 6 minutes less time per day spent complaining about the indoor conditions.

14. Improves worker satisfaction because people working in a comfortable, healthy environment are happier.

15. Can deliver 72° F. cool and dry space temperatures in the cooling/dehumidification season at lower energy costs than current solutions deliver 78° F. hot and muggy working spaces.

16. Improves health and wellness and reduces healthcare costs, improves corporate bottom lines and shareholder value.

17. Improves building valuations. For example, a comfortable, healthy building commands a pretty decent rent premium. Higher profitability equates to higher tax revenues as buildings turn over.

18. Lowers lifecycle costs and reduces equipment run time, saves maintenance and energy money.

19. Improves military resiliency because less need for refueling and resupply convoys.

20. Improves use and effectiveness of installed infrastructure. Can help to avoid waste of capital investment. A facility can deliver 30% to 100% more cooling capacity through the existing pipeline infrastructure. A facility can serve 20% to 40% greater cooling loads if the existing systems are chiller capacity constrained. Avoids substantial capital costs for expansions, increased loads and serving existing loads.

21. Can allow the use of series or series/parallel chillers. Improves chiller plant capacity by 20% or more, and another 20%+/−efficiency improvement for cooling/dehumidification/reheat loads.

22. Can allow much greater annual use of "Waterside Economizer" (WE) or "Free Cooling" (FC) systems. WE or FC systems typically consume 0.05 to 0.15 kWh per ton hour for cooling, vs. most chiller plants at 0.50 to 2.5 kWh per ton-hour. 1,000 extra WE or FC hours per year for a 1,000 ton load can save an additional 350,000 kWh to well over 1,000,000 kWh per year. These savings would typically occur in the winter, when solar output is lowest, helping to right size solar based energy production.

23. Can use HEDS cooling coil and cooling recovery coils as chillers in the winter, when coupled with fresh air economizer systems or high outside air % systems, such as labs, hospitals, fabs, clean rooms and other manufacturing facilities. Also reduces the amount of heating energy that is required by the amount of energy that is consumed by other loads on the CHW loop.

24. Can substantially reduce HVAC equipment runtime for non-8,760 loads. Late start, and early stop thermal flywheel logic can be incorporated into the system. The extra-large coil sizes allow control algorithms to be implemented that cannot be implemented as effectively without a HEDS design. Reduces energy and maintenance costs and needs.

25. Saves winter heating energy as well. The substantial size of the CC and CRC allow exhaust air heat recovery to be utilized to a much greater extent than with "normal" HVAC design strategies, saving winter heating energy when the chiller plants are shut down.

26. Allows hospital and medical facility related, OSHPD approved supply air volume and temperature reset strategies to be implemented that provide a lower internal relative humidity and a higher room temperature when the rooms are not in use. The air volume can be reduced to 25% of the design air volume, as long as pressure relationships are maintained in the controlled environments, reducing cooling and reheat energy use, fan and chiller plant energy use. Also, provides warmer supply air temperatures at lower RH values, to raise the room temperature and lower room RH, while decreasing cooling/dehumidification season cooling loads due to skin losses. The closer the internal and external temperatures are, the less heat transfer occurs.

27. Allows systems that are only equipped with pre-heat coils and cooling coils to be retrofit to allow the PHC to be used for discharge air relative humidity control. Many existing systems have no ability to perform reheat/RH control due to their configuration that may not include a reheat coil, or reheat energy source that is available in the dehumidification season.

28. Allows facilities that have been built with "two-pipe" water distribution systems to perform reheat duties for reheat/RH control. Two-pipe systems provide cooling water in the cooling/dehumidification season, and heating water in the heating season, there is no heating source available for reheat in the dehumidification season and there is no cost effective way to perform cooling/dehumidification/reheat functions without HEDS installations.

29. Scalable solution: HEDS can be cost effectively built with less than 100 CFM delivered to more than 1,000,000 CFM delivered. No other solution is similarly scalable.

30. Aids in resiliency and increases fault-tolerance. Even when the cooling plant equipment has operational issues, the larger coils/heat transfer surface area of the HEDS unit allows some amount of cooling/dehumidification/reheat to be delivered, while sending the "spare" capacity to other cooling loads.

31. Allows substantial system-wide energy savings to occur. Using a dedicated "pony" chiller in conjunction with HEDS, critical loads can be provided with lower chilled water supply temperatures, while larger loads use a much warmer and more energy efficient CHW supply temperature. The pony chiller would be piped in series with the chiller plant, and located in a manner that reduces the chilled water supply temperatures for the critical loads. Depending on the loads being served and entering HEDS unit conditions, HEDS coils allow the critical load CHW supply temperatures to be higher than typical, so even the critical load energy use is reduced.

32. Reduces manpower needs via automatic resets. HEDS automatically resets air volume, static pressure, dew point and dry bulb temperatures, chilled water supply temperature and differential pressure set-points based on the needs, loads and internal and external commands. No need for operator intervention. Saves energy.

33. Continuously learns what is needed to keep the facility under control and mold free. HEDS control strategies can utilize variable space/load dew point and dry bulb temperature set-points as needed for comfort, process, product and mold control situations based on the materials of construction of the facility and the facility and process needs. Similar to the above, control strategies can be used based on weather forecasts and facility/load response to previous events and conditions (learning algorithm). Similar to the above, the HEDS control strategy can be driven by occupancy, production rates, anticipated occupancy or anticipated production rates, current weather, or anticipated weather, current electrical grid and micro-grid needs or anticipated electrical grid and micro-grid needs.

34. Generates water for other uses. Condensate generated by the system can be used for pre-cooling of loads, then filtered and purified for various uses, or use unpurified for industrial uses. Can be used to generate water from engine and turbine exhaust streams, as well as typical HVAC loads.

35. Improves resiliency and reduces resupply convoys, saving lives. HEDS units designed for military use, i.e. Forward Operating Bases (FOB's) can be part of an integrated cooling/dehumidification/reheat, cogeneration, energy storage, water generation solution that will greatly reduce the number of resupply convoys that are needed for fuel and water. Fuel and water accounts for more than 70% of convoy hauled weight.

36. Reduces mold and corrosion for maritime uses. Can allow "pre-positioned" military cargo ships to meet their internal temperature and RH mandates while consuming 40% less energy, allowing time on station to be increased by 20% to 30% without refueling. Currently, internal temperature and RH conditions are rarely met when a ship is deployed to the Middle East or other harsh environment. Large portions of ships can be quarantined due to mold, and thousands of sailor manpower hours are spent each deployment to try to control rust and corrosion.

37. Can help to save Federal Gov't $100's of millions. All of the benefits described here apply. Decreases deficits.

38. Made in the USA. Homegrown, developed, built and tested in the USA by Americans! Can help to meet potential "Made in America" requirements.

39. Shows that the Federal Govt. can help move promising technologies forward at minimal financial risk. ESTCP mechanism provided small amount of funding (<$1.5M) to allow initial field tests—no need for large "invest" (e.g. $500M). ESTCP provides a level playing field for the lone inventor to compete against multi-billion dollar global corporations and be selected as one of the most promising technologies to evaluate.

40. Winner of the DOE/FEMP Jump Energy Efficiency Technology competition. FEMP JUMP is similar to ESTCP in that it provides a level playing field for the lone inventor to compete against multi-billion dollar global corporations and be selected as the most promising technology to be evaluated by one of the National laboratories.

41. Essentially eliminates mold remediation and reconstruction costs associated with HVAC system-caused mold growth.

42. Eliminates HAZMAT issues associated with HVAC system-caused mold growth.

43. Reduces equipment maintenance. No need to run existing equipment to maintain RH conditions inside unoccupied spaces.

44. Eliminates poor efficiency, low load operation of existing equipment.

45. Drier indoor conditions allow the use of higher indoor air temperature, which lowers indoor RH.

46. Helps to dry out already wet/damp spaces.

47. Fault detection and diagnostics equipped.

48. Algorithms to determine need/frequency/duration of operation based on sampling of internal conditions—reduces run times and power demands of the unit even further.

49. Resetting flows, volume, loads continuously as needed—optimization algorithms.

50. Maintains positive pressurization for the building to keep moisture being pushed outward.

51. Built in pressurization controls.

52. Can be built in shipping container sized modules.

53. Control algorithms can help shape electrical grid loads and are renewable friendly. Frequency regulation (reg-up, reg-down) demand response, broad increases and decreases in the grid demand profile and is responsive to grid needs. In some embodiments, auto-senses the need to reg-up and reg-down, or ramp up and ramp down (voltage, frequency sensing in some options). In other embodiments, signals are provided to direct the system to operate those various sequences of operation.

54. Allows facilities that have been built with "two-pipe" water distribution systems to perform reheat duties for reheat/RH control. Two-pipe systems provide cooling water in the cooling/dehumidification season, and heating water in the heating season, there is no cost effective way to perform cooling/dehumidification/reheat functions without HEDS and ERHEDS installations.

55. Incorporates learning algorithms, to continuously learn what is needed to keep the facility under control and mold free. HEDS and ERHEDS control strategies can utilize variable space/load dew point and dry bulb temperature set-points as needed for comfort, process, product and mold control situations based on the materials of construction of the facility and the facility and process needs. Similar to the above, control strategies can be used based on weather forecasts and facility/load response to previous events and conditions (learning algorithm). Similar to the above, the HEDS control strategy can be driven by occupancy, production rates, anticipated occupancy or anticipated production rates.

56. Generates water for other uses. Condensate generated by the system can be used for pre-cooling of loads, filtered and purified for various uses, or use unpurified for industrial uses.

Other Embodiments

FIG. 1B illustrates another exemplary architecture of a climate control system using HEDS technology. The HEDS unit 100 architecture is substantially similar to that of FIG. 1A, with the addition of a reheat coil (RHC) 178 positioned after the CRC 120. The reheat coil 178 allows for the air to be heated even further before exiting unit 100.

FIG. 2A illustrates an example of the HEDS unit 200 that is the same or similar to the HEDS unit 100 shown in FIG. 1A, with example piping configurations for systems used in locations that require heating and/or cooling or dehumidification. The piping and/or tubing configurations can allow the use of reclaimed energy from the cooling process to be used as a pre-heating energy source. The pre-heating energy source can false-load the compressor and allow the unit to not cycle on and off, and/or can allow the unit to provide heated air to the space at a relatively low RH level.

FIG. 2B is a schematic diagram of an example of a climate control system 280 similar to the climate control system 180 of FIG. 1B, with example piping added.

FIG. 3A illustrates an example of the HEDS unit 300 that is the same or similar to the HEDS unit 100 shown in FIG. 1A, with example piping configurations for systems used in locations that only require cooling and/or dehumidification.

FIG. 3B is a schematic diagram of an example of a climate control system 380 similar to the climate control system 180 of FIG. 1B, with example piping added.

HEDS Based Ground Source Heat Pump Earth Field Capacity Enhancement System

FIGS. 4A, 4B, 5A, and 5B depict examples of a cooling/heating plant based on a modified heat pump design (or standard chiller-based design) that is built to provide relative humidity control, even down to 0% cooling loads, while enhancing the capacity of the earth-coupled field 2040 that it is attached to.

The cooling/heating plant (such as cooling plant 102 of FIGS. 1A, 1B, 2A, 2B, 3A, and 3C) may include a heat pump system or a cooling system utilizing a ground coupled heat rejection system, a heating/cooling energy recovery unit #1 (HCRU #1) 2010, a heating/cooling energy recovery unit #2 (HCRU #2) 2020, and optionally additional heating/cooling energy recovery units (HCRU # . . . ) 2030. The ground coupled heat rejection system may have a ground coupled field for heat rejection or heat reclamation 2040.

Further, a cooling augmentation system 2060 may be present. The cooling augmentation system 2060 allows added "cooling energy" to be injected into the piping loop for instantaneous use, or injected into the ground coupled field, for use at a later time. A heating augmentation system 2070 may also be present. The heating augmentation system 2070 allows added "heating energy" to be injected into the piping loop for instantaneous use, or injected into the ground coupled field, for use at a later time. A heat pump system or cooling system 1300 utilizes the ground coupled heat rejection system.

Many existing earth sourced systems are no longer effective, as their heat rejection/absorption fields are undersized for the loads being served. Heating dominated HVAC or process load systems tend to overcool the earth source over time, and cooling dominated HVAC or process load systems tend to overheat the earth source over time. The current subject matter can bring those systems back to life.

In addition to increasing the effective capacity of the earth to store and reclaim energy, the current subject matter can solve many common problems associated with HVAC heating, cooling, dehumidification, reheat systems. Performance, ability to control relative humidity and mold growth, resiliency, reliability, robustness and energy consumption are addressed. The ability to be controlled to influence the electrical load on the grid by ramping up and ramping down, and to respond as a Distributed Energy Resource (DER), and be included in Demand Response (DR) programs, while still maintaining relative humidity control in the conditioned spaces, while consuming zero site water for heat rejections, is of paramount importance, and is unique to the systems described herein.

Figure 4A:
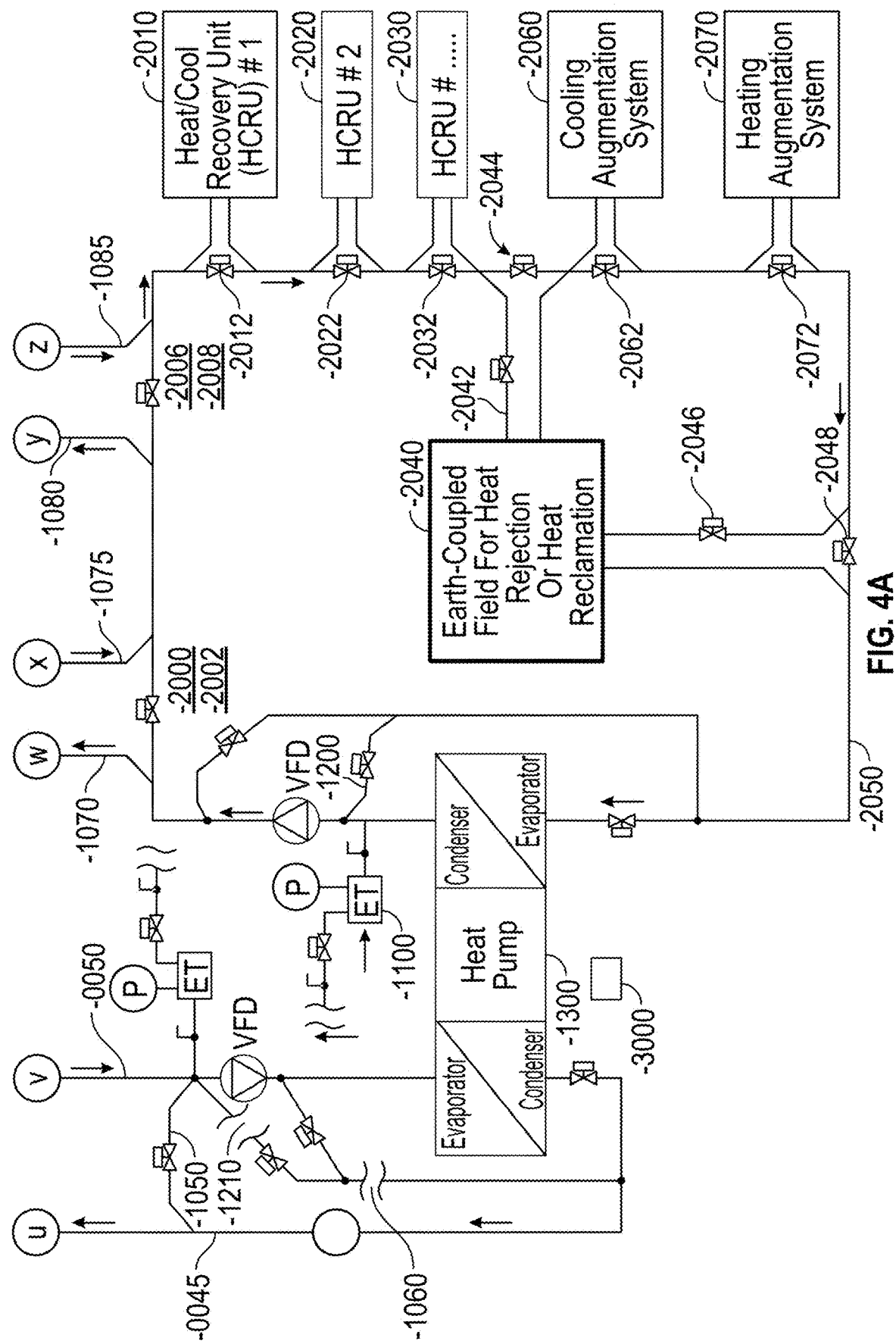
FIGS. 4A, 4B, 5A, and 5B depict examples of a cooling/heating plant based on a modified heat pump design (or standard chiller-based design) that is built to provide relative humidity control, even down to 0% cooling loads, while enhancing the capacity of the earth-coupled field to which it is attached, or reducing heat rejection loads and water and chemical use.
Figure 4B:
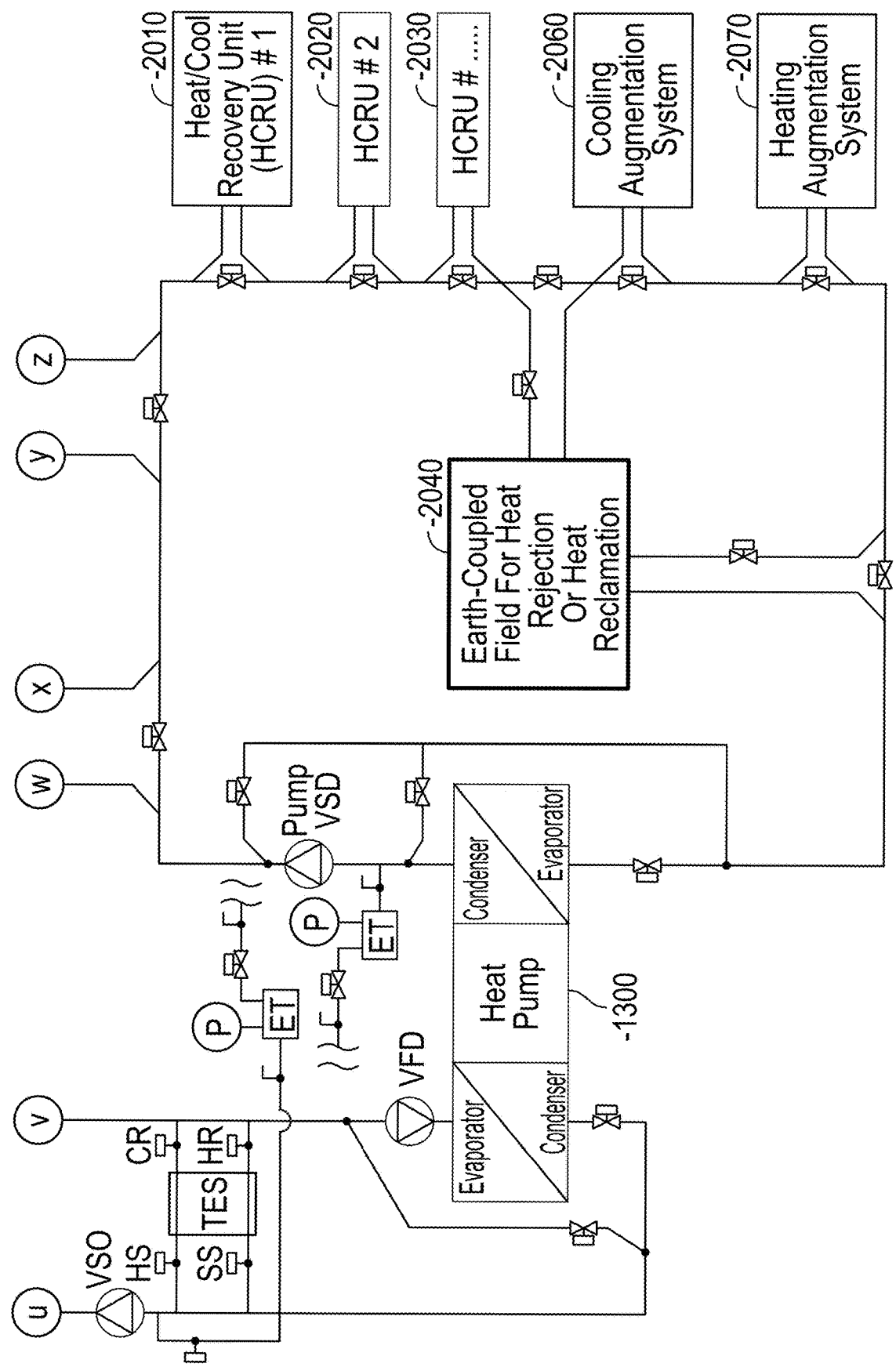
Figure 5A:
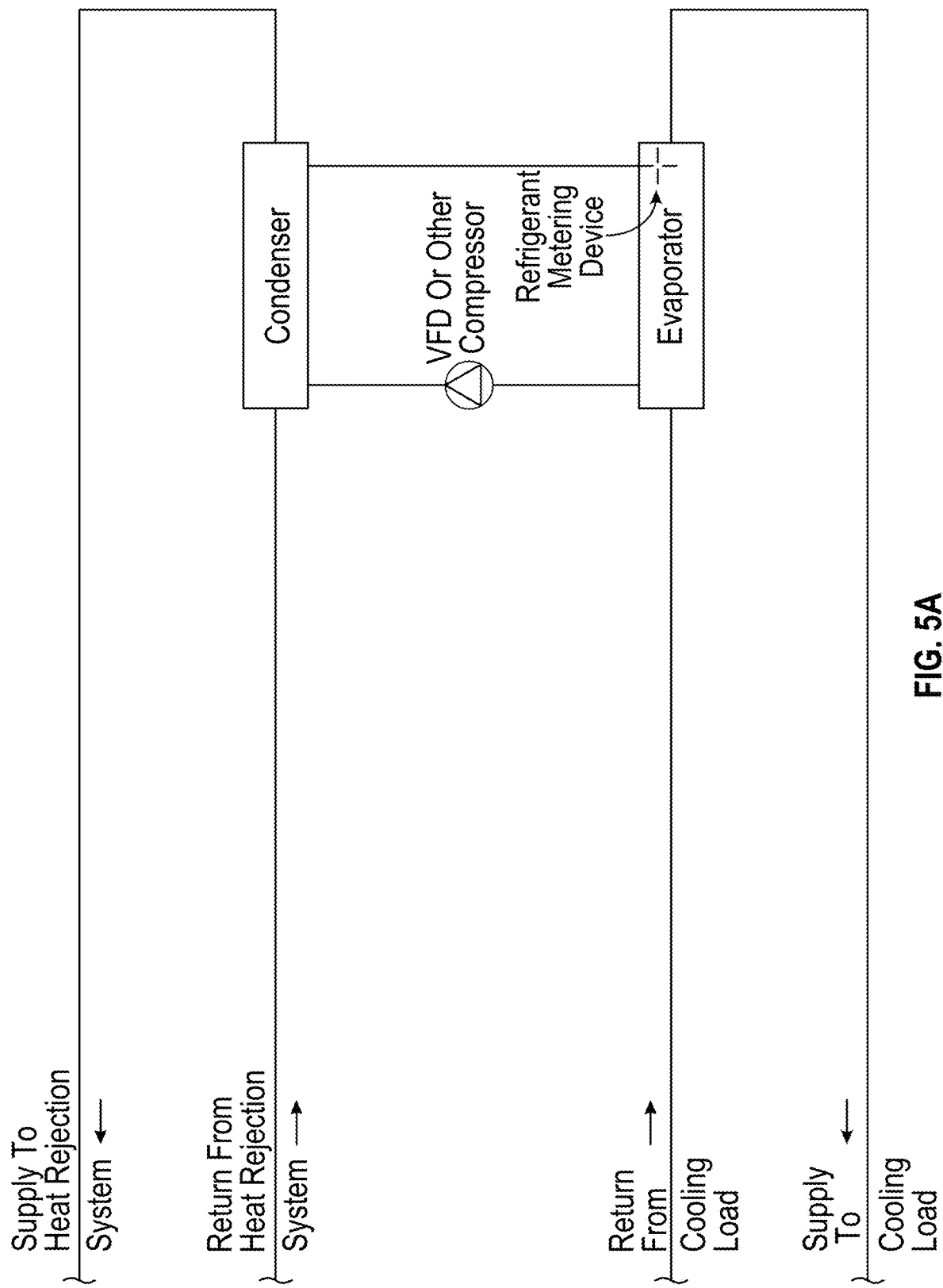
Figure 5B:
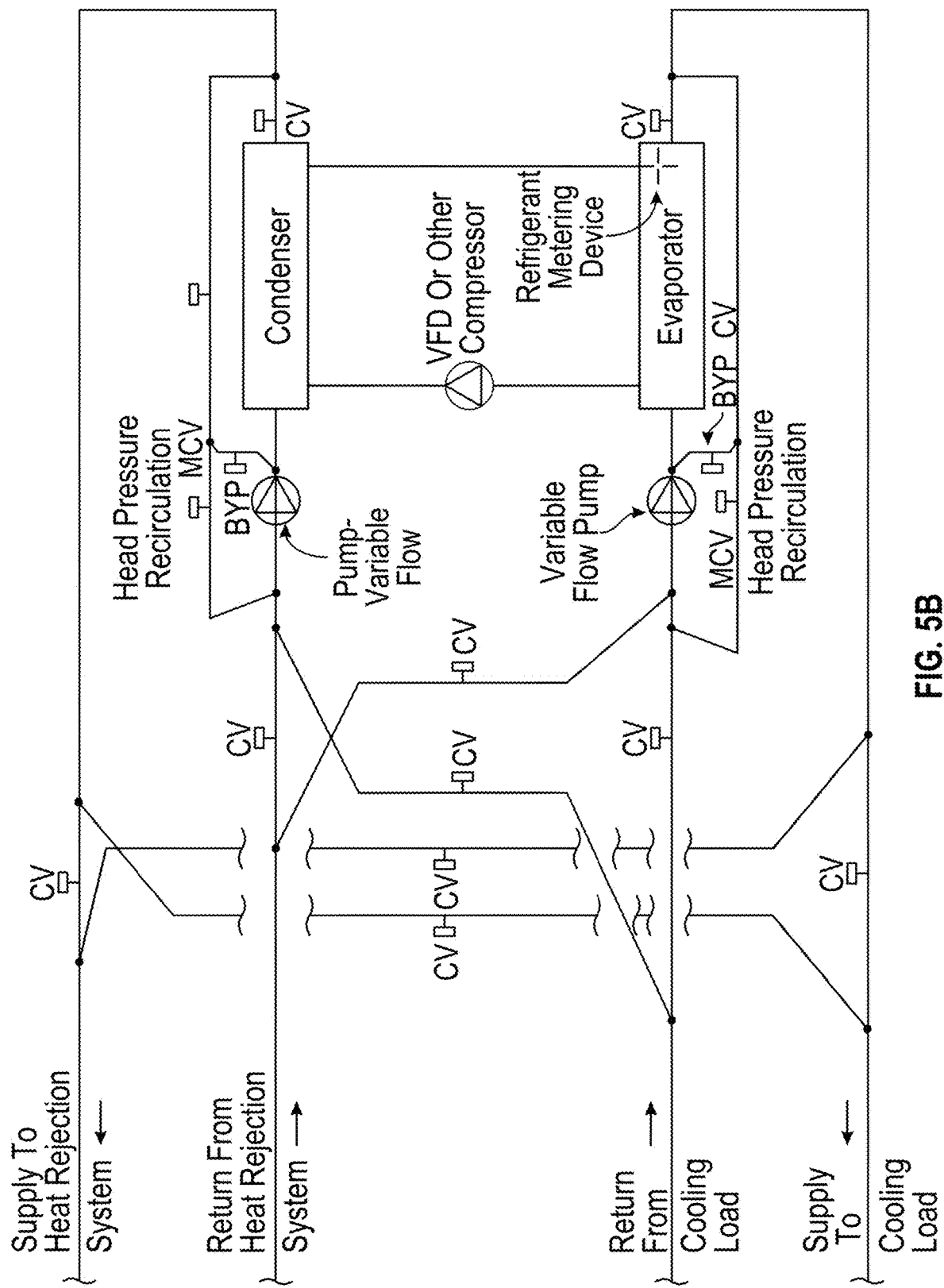

Heating and cooling load-side Thermal Energy Storage (TES) allows smaller systems to be utilized, or undersized systems to begin to serve their loads, or compressor systems to be utilized when renewable energy or less expensive energy is available and then shut down to utilize the stored thermal energy when renewable capacity is reduced, or when utility costs are higher. The load side design is unique, in that the TES tank can be utilized for heat energy storage as well as cooling energy storage with a very simple valve system and control strategy. One strategy is shown in FIG. 4B, other strategies that may utilize different pumping and valve arrangements can be utilized as well. The load side TES system can be charged with heating or cooling energy via the compressor system, or when weather conditions are favorable, the HCRU equipment 2010, 2020, and 2030 and the cooling and heating augmentation systems 2060 and 2070 connected via the ground loop piping system may be able to provide capacity in an efficient manner. Stored energy that may be directly available from the earth field (without operating the compressors) can also be used to charge the load side TES systems.

These implementations significantly decrease the cooling and dehumidification loads that need to have heat rejected into the earth, and allow much colder heating water temperatures to be used to keep facilities warm or process loads met. Thus the effective capacity of the earth to work with the HVAC systems is greatly enhanced. The combined systems can greatly increase the applicability, effectiveness, efficiency and site availability for ground-sourced, or earth-sourced heat pump systems. (sometimes referred to as geothermal heat pumps, geo-exchange heat pumps, or earth-coupled heat pump systems).

The equipment sizing, design and control strategies allow the use of the cooling energy stored in the earth during the heating season or the cooling augmentation system 2060, or the HCRU's 2010, 2020, and 2030 to be used directly to provide cooling to the cooling coils (CC) 118, without running the compressor for a significant number of hours each year. The HEDS CC 118 sizing is such that the "cold" water temperatures can be very high while still providing enough cooling energy to keep the facility cool. During the spring, in many locations, it is likely that the compressor will not be run until the humidity levels get too high, or the water temperature available from the earth-source or provided by the cooling augmentation system 2060, or the HCRU's 2010, 2020, and 2030 is just below the desired dewpoint temperature. With this subject matter, compressor run time can be minimized, extending equipment life and reducing energy waste. When dehumidification is needed, the cold water temperatures being withdrawn from the earth loop or provided by the cooling augmentation system 2060, or the HCRU's 2010, 2020, and 2030 can be as close as 2° F. to the desired dewpoint temperature of the air being supplied by the unit. Even as the cooling source energy is warmed up, there may be many hours a day when the cooling and/or cooling/dehumidification loads can be met with direct earth-sourced cooling, or provided by the cooling augmentation system 2060, or the HCRU's 2010, 2020, and 2030 rather than compressor-augmented earth-sourced cooling.

Similarly, during the fall, when heating loads may be low, and the water temperatures available from the earth-sourced system are the highest, it is likely that the compressor will not need to be run to create heating hot water to meet facility or process needs, heating energy can be directly sourced from the earth fields or obtained or augmented by the HRCU's 2010, 2020, and 2030.

There will be many hours when the cooling augmentation system 2060 can be utilized to provide chilled fluid to the HEDS CC 118 to meet cooling needs without compressor operation, and the heating augmentation system 2070 can be utilized to provide warmed fluid to the HEDS CC 118 to meet cooling needs without compressor operation, further reducing compressor run time and extending equipment life.

If this system is combined with Underground Thermal Energy Storage (UTES), Aquifer Thermal Energy Storage (ATES), or Borehole Thermal Energy Storage (BTES), the ability to utilize earth-sourced heating and cooling energy directly to meet facility or process needs, without the need to operate the compressor(s) to augment the temperatures is enhanced even further.

The subject matter is shown to use closed loop systems on both sides of the heat pump. With appropriate equipment and filtration, open loop can be utilized, where allowed, for the earth-sourced side of the system.

The subject matter allows simultaneous heating and cooling using 100% recovered energy, for any or all loads connected to the system. Some loads may be in heating only, some may be cooling only, and some may be in cooling/dehumidification/reheat. Cooling and heating energy can be stored in the earth even when the compressor(s) are not running.

The diagrams depict multiple piping and equipment configurations that allow a multitude of different operating strategies and enhanced efficiency, capacity and energy storage to occur.

Implementations described herein can unload effectively and reliably down to 0% (zero percent) cooling load while providing the desired supply air dry bulb and dewpoint temperatures required to meet internal temperature, dewpoint and relative humidity conditions, where other systems cannot perform these duties. This is required to help prevent biological growth from occurring.

With the proposed subject matter, reduced refrigerant pressures in the condenser result, as the heat is rejected to create the false load, which lowers the fluid temperature of the return stream that is used to cool the refrigerant in the condenser. Removing heat from the heat rejection system via the preheat coil and/or reheat coil to false load the compressor or control temperatures or RH reduces the refrigerant pressure in the condenser, improving energy efficiency and capacity.

These implementations are unique in that by using heat rejected from the compressor system via the preheat and reheat coils, or by direct injection into the plant to false load the compressor, the condenser cooling liquid temperature can be reduced in a meaningful manner. This allows the head pressure (condenser side refrigerant pressure) to be reduced with essentially zero energy expended, improving compressor and system capacity and efficiency.

A sample situation follows: Assume that the ambient conditions are >55° F. and <60° F. and it is foggy or high humidity outside. The facility would typically be in the heating mode of operation, but if heating is provided without cooling and dehumidifying the air, the indoor conditions will have unacceptably high relative humidity, especially if the spaces are only heated to 68° F. as is the case with many facilities. To solve this problem, the fresh air being brought into the building needs to be sub-cooled down to 55° F. or lower and then reheated to some degree for most buildings to maintain the desired indoor RH levels. The cooling load of the fresh air being brought into the building is very small, too small for cooling systems to reliably serve, so the compressor serving that cooling load will cycle on and off. Every time the compressor cycles on, the cooling capacity is too high, even with Hot Gas ByPass (HGBP) or other false-loading technologies, so the air is overcooled, and the coil fin pack is loaded with a significant amount of condensed moisture. Because the supply air temperature is too low, the compressor cycles back off, in short order. Now, when the compressor cycles off, the near 100% RH fresh air being brought into the building is untreated, and in fact may be re-evaporating the moisture that is being held in the coil fin pack, so RH control of the spaces is lost. When this situation occurs with various implementations of these systems, those very low loads can be met and controlled successfully. To ensure that the compressor does not cycle on and off and create RH and temperature control issues, load, in the form of rejected heat energy from the condenser side of the system, would be injected either upstream from the cooling coil in the preheat coil (PHC) 122 to warm up the air entering the CC 118, or, in the absence of the need for a preheat coil 122, heat would be injected into the chilled fluid loop, to add load directly to the system. The controls would be enabled to keep the compressor operational with minimal to zero on/off cycling. If this situation occurs when there is fluid available from the earth loop or the HCRU's 2010, 2020, and 2030 or the cooling augmentation system 2060 at a low enough temperature, the compressor would not be enabled at all, and the loads would be met directly through the use of the various piping, valve and pumping arrangements that interconnect the two sides of the system.

Multiple Heating/Cooling Recovery Units (HCRU) are shown. These devices are unique in that they can either recover heating or cooling energy from the piping loop to serve another load, or they can inject heating or cooling energy into the piping loop from other sources.

In some embodiments, the source of some or all of the cooling and heating energy could be the domestic water system.

The system piping connections for the PHC 122 and RHC 178 could also be reversed if it is desired to have a higher quality heat available for the RHC 178 to heat the air up to a higher temperature and to lower the RH of the air leaving the unit even further.

The earth-coupled field 2040 is shown to be connected into the piping loop in two different locations, although additional locations can be included as needed to meet the needs of the system. The two piping systems that are shown allow the capacity of the ground field to be augmented and utilized in novel ways. During cooling/dehumidification season heat rejection to the ground, the heating energy going into the ground can either be decreased by rejecting heat to the atmosphere via the cooling augmentation system 2060, or it can be increased by adding heat from another source, potentially renewable or reclaimed from another waste heat source.

During the winter, or heating season, added cooling energy can be obtained to augment the cooling earth source for the following cooling season. The earth-coupled field 2040 piping connections upstream from the augmentation systems 2060 and 2070 can be used when the heat sink (or source) does not have enough instantaneous capacity and needs to be augmented to meet current needs. The downstream piping POC can be used when it is desired to augment the capacity of the heat sink (source) for the following season (or day).

Another unique part of the subject matter is two sets of valves that provide two functions. During the cooling season, especially at the start of the cooling season, on the earth-loop side of the piping system, there may be fluid being delivered from the earth loop into the condenser side of the system that is too cold to allow proper operation of the compressor system—the refrigerant pressure could be too low to allow proper refrigerant flow volumes and orifice/ expansion valve operation to occur, so the system may fault and fail on a frequent basis. The earth loop pumping system will typically be variable flow, and to control refrigerant head pressure when excessively cold fluid is available, the pump speed will be modulated to its minimum flow setpoint. If the minimum flow from the earth loop is still too high, and the condensing pressure is too low, the pump flow rate would need to be reduced further, but the condenser heat exchangers have a minimum required flow rate through them. One of the valves performs two functions simultaneously, and is modulated to control both head pressure and minimum flow rate through the condenser heat exchanger system.

Another set of valves is utilized to completely bypass the condenser side (described for the cooling mode) of the heat pump, when there is the ability to utilize the cooling or heating energy stored in the earth loop, or available from the HCRU's 2010, 2020, and 2030 or heating or cooling augmentation systems 2060 and 2070 without the compressor being operated.

On the evaporator side of the heat pump (load side during the cooling mode) there is a similar set of valves that allows the evaporator to be completely bypassed to allow cooling or heating energy to be distributed on the load side of the system without the need to operate the compressor(s), or experience the pressure drop through the heat exchanger, as well as providing fluid recirculation from the leaving side of the evaporator to the entering side of the evaporator for both temperature control and flow control. Especially at the start of the heating season, the fluid temperature leaving the earth-source may be too high for proper compressor/chiller/ heat pump operation. If the fluid temperature into the chiller is too high, these valves will be controlled in a manner to recirculate cold leaving water into the warm to hot entering water to reduce the water temperature into the chiller.

With this and other hydraulic diagrams, pressure relief valves are not shown, but are required to any section of piping or equipment that can be isolated between two valves without direct hydraulic access to an expansion tank.

Figure 6:
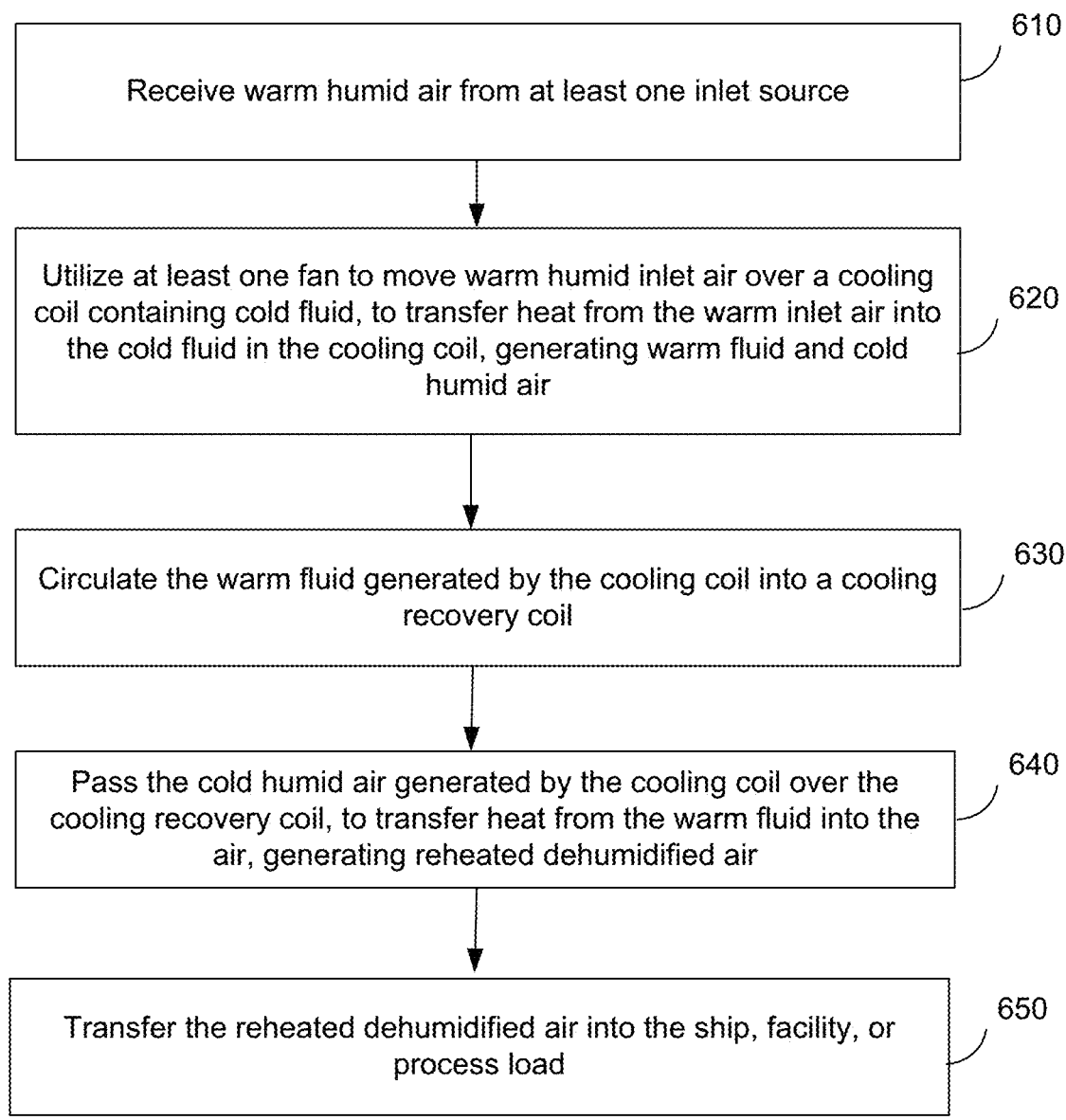
FIG. 6 illustrates an exemplary method for practicing embodiments of the present disclosure.

FIG. 6 illustrates an exemplary method for practicing embodiments of the present disclosure discussed herein. In step 610, warm humid air is received from at least one inlet source. The inlet air source can be either 100% from an outside environment, a combination of outside air mixed with air from a facility, or 100% air from a facility.

In step 620, at least one supply fan is utilized to pass the inlet air over a cooling coil containing cold water. The cooling coil has heat transfer fins, such that when the air passes over it, heat is transferred from the inlet air (that is warm and has a high RH) into the fluid of the cooling coil. Thus, the fluid in the cooling coil is heated and the air is cooled at substantially 100% RH.

In step 630, the warm fluid generated from the cooling coil is circulated into a cooling recovery coil. In step 640, the cooled humid air generated from the cooling coil is passed over the cooling recovery coil to transfer heat from the fluid back into the air. By heating the air, the relative humidity of the air decreases, even though the total moisture content may remain constant. Thus, the reheated air leaving the cooling recovery coil is dehumidified.

In step 650, the reheated dehumidified is circulated into the facility where dehumidification is being conducted. By transferring dehumidified air back into the facility, condensation and thus mold growth is prevented from occurring on surfaces within the facility. Transferring cold air into a humid facility causes the moisture in the air to condense when it touches surfaces at room temperature in the facility, which in turn causes mold growth.

Reclaiming the heat from the inlet air and putting it back in the outlet air before transferring to the facility, further obviates the need for a separate boiler or heater before step 650. In addition, the fluid leaving the cooling recovery coil is cooled (since heat was transferred out of it and into the air). Thus, when this fluid returns to a chiller plant for cooling before returning to the cooling coil, less load is put on the chiller plant.

As would be understood by persons of ordinary skill in the art, fluid other than water may be utilized within the cooling coil and/or the cooling recovery coil. Further, additional steps may be present in method 600 than depicted in exemplary FIG. 6.

Figure 7A:
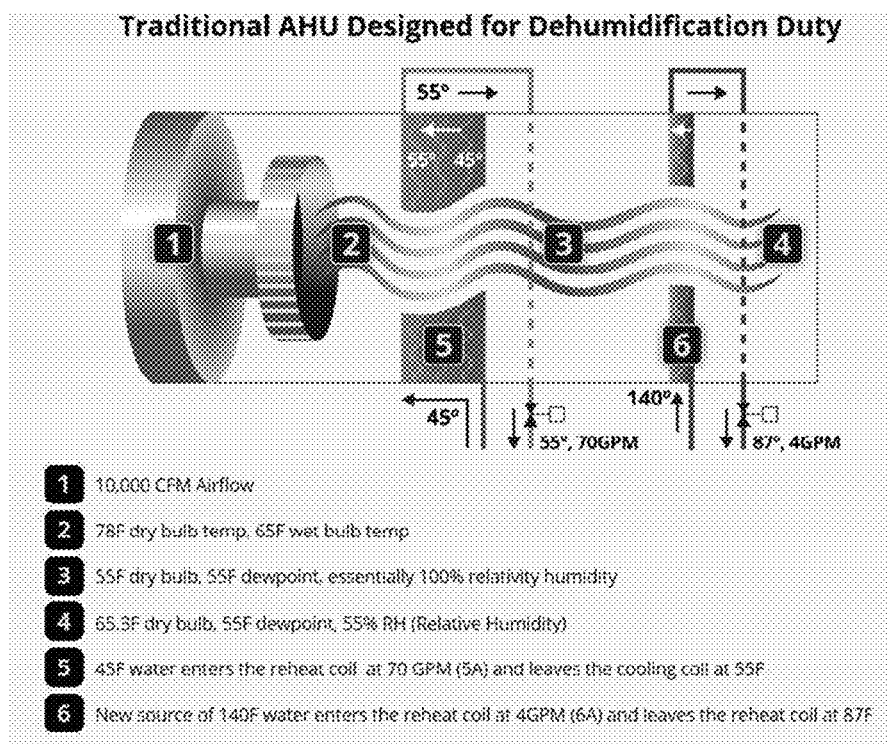
FIG. 7A illustrates a prior art dehumidification process.

FIG. 7A illustrates a traditional air handling unit designed for dehumidification. In FIG. 7A, 45° F. water enters the reheat coil and leaves the cooling coil at 55° F. Then a new source of 140° F. water is needed to enter the reheat coil, which then leaves the reheat coil at 87° F.

Figure 7B:
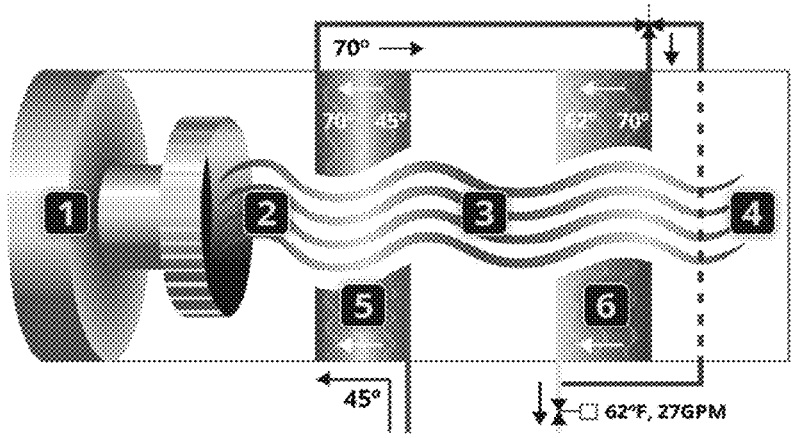
FIG. 7B illustrates a dehumidification process, according to exemplary embodiments.

FIG. 7B illustrates a high efficiency dehumidification system, according to embodiments of the present disclosure. In FIG. 7B, 45° F. water enters the cooling coil, and leaves the coil at 70° F. This 70° F. water is then recirculated into the cooling recovery coil. Heat transfers from the water into the air passing over the cooling recovery coil, such that the air is heated to 65° F. and the water is cooled from 70° F. to 62° F. In this way, water leaves the system and enters the chiller at a lower temperature, which reduces the load on the chiller as well.

Figure 8:
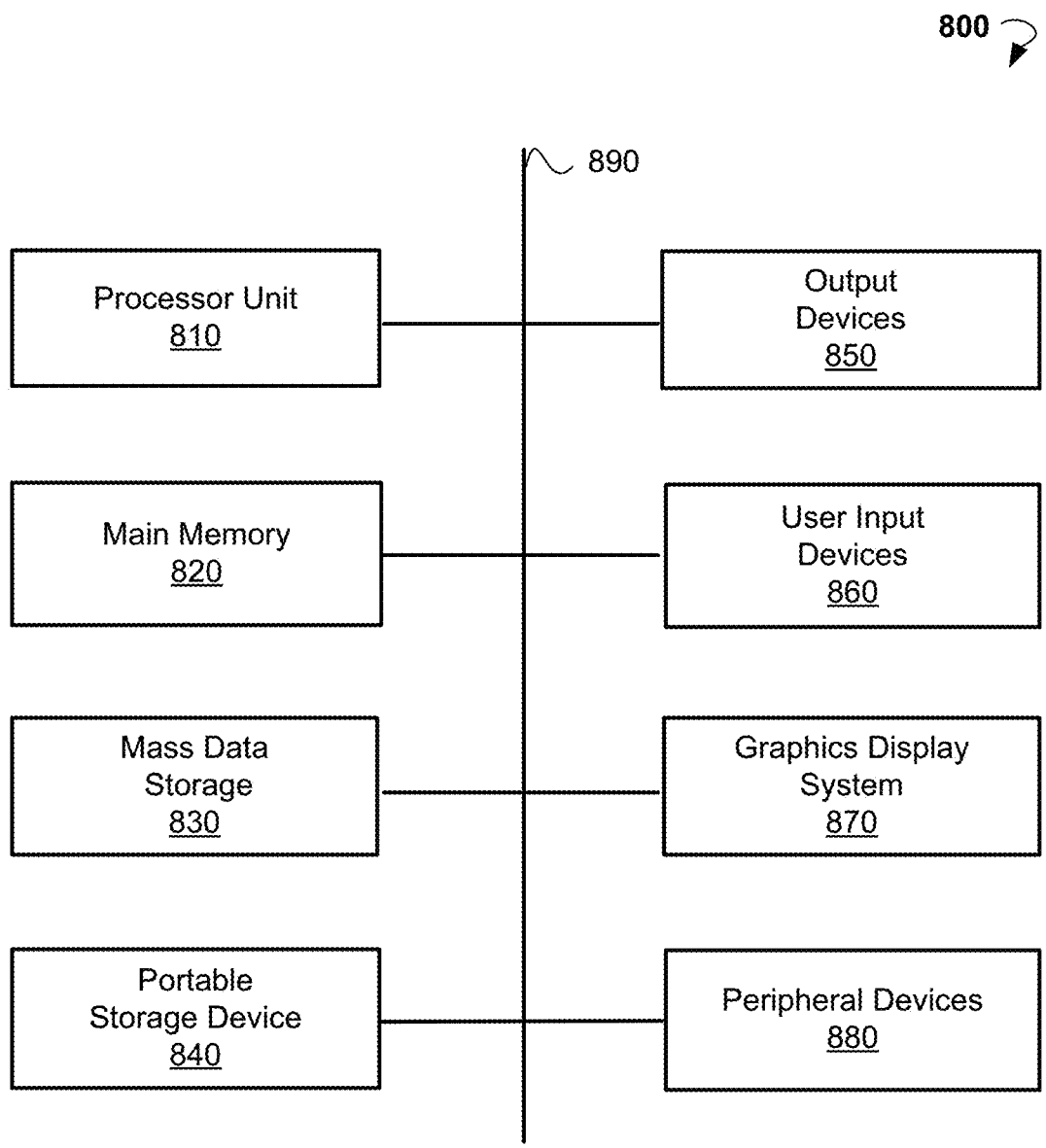
FIG. 8 illustrates a diagrammatic representation of an example machine in the form of a computing system, within which a set of instructions for causing the machine to perform any one or more of the methodologies discussed herein is executed.

FIG. 8 illustrates an exemplary computer system 800 that may be used to implement various software processes according to embodiments of the present disclosure. The computer system 800 of FIG. 8 may be implemented in the contexts of the likes of computing systems, networks, servers, or combinations thereof. The computer system 800 of FIG. 8 includes one or more processor unit(s) 810 and main memory 820. Main memory 820 stores, in part, instructions and data for execution by processor unit(s) 810. Main memory 820 stores the executable code when in operation, in this example. The computer system 800 can include a mass data storage 830, portable storage device 840, output devices 850, user input devices 860, a graphics display system 870, and peripheral devices 880.

The components can be connected via a single bus 890. The components may be connected through one or more data transport means. The processor unit(s) 810 and main memory 820 can be connected via a local microprocessor bus, and the mass data storage 830, peripheral devices 880, portable storage device 840, and/or graphics display system 870 can be connected via one or more input/output (I/O) buses.

The mass data storage 830, which can be implemented with a magnetic disk drive, solid state drive, or an optical disk drive, can be a non-volatile storage device for storing data and instructions for use by processor unit(s) 810. The mass data storage 830 can store the system software for implementing embodiments of the present disclosure for purposes of loading that software into main memory 820.

The portable storage device 840 can operate in conjunction with a portable non-volatile storage mediums (such as a flash drive, compact disk, digital video disc, or USB storage device, to name a few) to input and output data/code to and from the computer system 800. The system software for implementing embodiments of the present disclosure can be stored on such a portable medium and input to the computer system 800 via the portable storage device 840.

The user input devices 860 can provide a portion of a user interface. The user input devices 860 may include one or more microphones; an alphanumeric keypad, such as a keyboard, for inputting alphanumeric and other information; or a pointing device, such as a mouse, a trackball, stylus, or cursor direction keys. The user input devices 860 can also include a touchscreen. Additionally, the computer system 800 as shown in FIG. 8 includes output devices 850. Suitable output devices 850 include speakers, printers, network interfaces, and monitors.

The graphics display system 870 can include a liquid crystal display (LCD) or other suitable display device. The graphics display system 870 can be configurable to receive textual and graphical information and process the information for output to the display device.

The peripheral devices 880 may include any type of computer support device to add additional functionality to the computer system.

The components provided in the computer system 800 can be found in computer systems. The computer system 800 can be a personal computer (PC), hand held computer system, telephone, mobile computer system, workstation, tablet, phablet, mobile phone, server, minicomputer, mainframe computer, wearable, and/or any other computer system. The computer may also include different bus configurations, networked platforms, multi-processor platforms, and/or the like. Various operating systems may be used including UNIX, LINUX, WINDOWS, MAC OS, PALM OS, QNX ANDROID, IOS, CHROME, TIZEN and other suitable operating systems.

The processing for various embodiments may be implemented in software that is cloud-based. In some embodiments, the computer system 800 is implemented as a cloud-based computing environment. In some embodiments, the computer system 800 may itself include a cloud-based computing environment. The computer system 800, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices.

The cloud may be formed, for example, by a network of web servers that comprise a plurality of computing devices, such as the computer system 800, with each server (or at least a plurality thereof) providing processor and/or storage resources. These servers may manage workloads provided by multiple users (e.g., cloud resource customers or other users). The description of the present subject matter has been presented for purposes of illustration and description, but is not intended to be exhaustive or limited to the present subject matter in the form disclosed. Many modifications and variations will be apparent to those of ordinary skill in the art without departing from the scope and spirit of the present subject matter. Exemplary embodiments were chosen and described in order to best explain the principles of the present subject matter and its practical application, and to enable others of ordinary skill in the art to understand the present subject matter for various embodiments with various modifications as are suited to the particular use contemplated.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A high efficiency dehumidification system providing reheated dehumidified air to a climate controlled facility, the high efficiency dehumidification system comprising:
   a heat pump that causes relative humidity control down to zero percent cooling loads while enhancing a capacity of an earth-coupled field, connected to the climate controlled facility;
   a heat pump system that stores heat energy in the earth-coupled field when the system is in a cooling mode, for later use when the system is in a heating mode and stores cool energy in the earth-coupled field when the system is in the heating mode, for later use when the system is in the cooling mode, connected to the climate controlled facility;
   a heat exchange system that augments a heating capacity of the earth-coupled field connected to the climate controlled facility;
   the heat exchange system that augments a cooling capacity of the earth-coupled field connected to the climate controlled facility; and
   the heat pump with piping and controls arranged to allow the heat pump to remain operational without cycling on and off down to zero percent cooling loads while controlling the relative humidity within the climate controlled facility at a desired set point.

2. The system of claim 1, further comprising a first inlet source from an outside environment.

3. The system of claim 2, further comprising: a second inlet source, the first inlet source configured to draw air from the outside environment, the second inlet source configured to draw the air from a portion of the climate controlled facility.

4. The system of claim 2, further comprising: a preheat coil for receiving a preheating liquid from one or more heat recovery units to preheat air from the first inlet source that passes over the preheat coil before passing the air over a cooling coil.

5. The system of claim 1, further comprising: a reheat coil to further heat dehumidified reheated air received from a cooling recovery coil.

6. The system of claim 1, further comprising: an Ultra Violet Germicidal Irradiation (UVGI) system and a Photocatalytic Oxidation (PCO) system, the Ultra Violet Germicidal Irradiation (UVGI) system positioned before the Photocatalytic Oxidation (PCO) system and both configured to disable and reduce growth of biological material on a cooling coil.

7. The system of claim 1, further comprising: an Ultra Violet Germicidal Irradiation (UVGI) system and a Photocatalytic Oxidation (PCO) system, the Ultra Violet Germicidal Irradiation (UVGI) system positioned after the Photocatalytic Oxidation (PCO) system and both configured to disable and reduce growth of biological material on a cooling coil.

8. The system of claim 1, further comprising: a cooling recovery coil plenum including a first damper system connecting ductwork of the climate controlled facility to the cooling recovery coil plenum.

9. The system of claim 1, wherein the high efficiency dehumidification system is further connected to a cooling plant via piping.

10. The system of claim 1, further comprising: a control system for modulating air flow through the high efficiency dehumidification system.

11. A method for providing dehumidified reheated air to a climate controlled facility using a high efficiency dehumidification system, the method comprising:
    using a heat pump that stores heat energy in an earth-coupled field when the high efficiency dehumidification system is in a cooling mode, for later use when the high efficiency dehumidification system is in a heating mode and stores cool energy in the earth-coupled field when the high efficiency dehumidification system is in the heating mode, for later use when the high efficiency dehumidification system is in the cooling mode connected to the climate controlled facility;
    using a heat exchange system to augment a heating capacity of the earth-coupled field connected to the climate controlled facility;
    having the heat exchange system that augments a cooling capacity of the earth-coupled field connected to the climate controlled facility; and
    having the heat pump with piping and controls arranged to allow the heat pump to remain operational without cycling on and off down to zero percent cooling loads while controlling relative humidity within the climate controlled facility at a desired set point.

12. The method of claim 11, further comprising: using a first inlet source from an outside environment.

13. The method of claim 11, further comprising: receiving air from a second inlet source, the second inlet source configured to draw the air from within a portion of the climate controlled facility.

14. The method of claim 12, further comprising:
    preheating air from the first inlet source by passing the air from the first inlet source over a preheat coil containing a preheating liquid, prior to passing the air over a cooling coil, wherein the preheat coil reduces the relative humidity of the air from the first inlet source.

15. The method of claim 11, further comprising: heating dehumidified reheated air from a cooling recovery coil via a reheat coil.

16. The method of claim 11, further comprising: using an Ultra Violet Germicidal Irradiation (UVGI) system and a Photocatalytic Oxidation (PCO) system, the Ultra Violet Germicidal Irradiation (UVGI) system positioned before the Photocatalytic Oxidation (PCO) system and both configured to disable and reduce growth of biological material on a cooling coil.

17. The method of claim 11, further comprising: using an Ultra Violet Germicidal Irradiation (UVGI) system and a Photocatalytic Oxidation (PCO) system, the Ultra Violet Germicidal Irradiation (UVGI) system positioned after the Photocatalytic Oxidation (PCO) system and both configured to disable and reduce growth of biological material on a cooling coil.

18. The method of claim 11, wherein a cooling recovery coil plenum includes a first damper system connecting ductwork of the climate controlled facility to the cooling recovery coil plenum.

19. The method of claim 11, wherein the high efficiency dehumidification system is further connected to a cooling plant via piping.

20. The method of claim 11, further comprising: modulating air flow through the high efficiency dehumidification system via a control system.

* * * * *

UNITED STATES PATENT AND TRADEMARK OFFICE
CERTIFICATE OF CORRECTION

PATENT NO. : 11,644,201 B2
APPLICATION NO. : 17/333686
DATED : May 9, 2023
INVENTOR(S) : Scot Matthew Duncan It is certified that error appears in the above-identified patent and that said Letters Patent is hereby corrected as shown below:

On the Title Page

In (71), after "Applicant: Scot Matthew Duncan," the text:
"Laguna Hills, CA (US)"
Should be:
"Lucas, TX (US)".

In (72), after "Inventor: Scot Matthew Duncan," the text:
"Laguna Hills, CA (US)"
Should be:
"Lucas, TX (US)".

In the Claims

In Column 27, Lines 31-32 (Claim 1), the line:
"the heat exchange system that augments a cooling capacity"
Should read:
"a heat exchange system that augments a cooling capacity".

Signed and Sealed this
Fifteenth Day of October, 2024

Katherine Kelly Vidal
*Director of the United States Patent and Trademark Office*